(12) United States Patent
Ding et al.

(10) Patent No.: US 11,348,571 B2
(45) Date of Patent: May 31, 2022

(54) METHODS, COMPUTING DEVICES, AND STORAGE MEDIA FOR GENERATING TRAINING CORPUS

(71) Applicant: BEIJING BAIDU NETCOM SCIENCE AND TECHNOLOGY CO., LTD., Beijing (CN)

(72) Inventors: Shiqiang Ding, Beijing (CN); Jizhou Huang, Beijing (CN); Zhongwei Jiang, Beijing (CN); Wentao Ma, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 222 days.

(21) Appl. No.: 16/810,070

(22) Filed: Mar. 5, 2020

(65) Prior Publication Data
US 2020/0294489 A1 Sep. 17, 2020

(30) Foreign Application Priority Data
Mar. 11, 2019 (CN) .......................... 201910179796.4

(51) Int. Cl.
*G10L 15/22* (2006.01)
*G10L 15/06* (2013.01)
(Continued)

(52) U.S. Cl.
CPC .............. *G10L 15/063* (2013.01); *G06N 5/04* (2013.01); *G06N 20/00* (2019.01); *G10L 15/22* (2013.01);
(Continued)

(58) Field of Classification Search
CPC .............................. G10L 15/063; G10L 15/22
See application file for complete search history.

(56) References Cited

U.S. PATENT DOCUMENTS 6,374,221 B1 4/2002 Haimi-Cohen
9,601,111 B2 * 3/2017 Winter .................... G10L 15/07
(Continued)

FOREIGN PATENT DOCUMENTS

CN 103871402 A 6/2014
CN 106992001 A 7/2017
(Continued)

OTHER PUBLICATIONS

Chinese Patent Application No. 201910179796.4 First Office Action dated Sep. 23, 2020, 11 pages.
(Continued)

*Primary Examiner* — Jialong He
(74) *Attorney, Agent, or Firm* — Lathrop GPM LLP

(57) ABSTRACT

The present disclosure provides methods, computing devices, and storage media for generating a training corpus. The method includes: mining out pieces of data from user behavior logs associated with a target application, each piece of data including a first behavior log and a second behavior log, the first behavior log including a user speech and a corresponding speech recognition result, the second behavior log belonging to the same user as the first behavior log and time-dependent with the first behavior log; and determining the user speech and the corresponding speech recognition result in each piece of data as a positive feedback sample or a negative feedback sample, based on the first behavior log and the second behavior log.

18 Claims, 19 Drawing Sheets

(51) Int. Cl.
*G06N 20/00* (2019.01)
*G06N 5/04* (2006.01)
*G10L 25/63* (2013.01)

(52) U.S. Cl.
CPC ........ *G10L 25/63* (2013.01); *G10L 2015/225* (2013.01)

(56) References Cited

U.S. PATENT DOCUMENTS

| | | | |
|---|---|---|---|
| 2003/0139925 A1* | 7/2003 | Anderson | G10L 15/065 704/231 |
| 2005/0080630 A1* | 4/2005 | Mills | G10L 15/01 704/276 |
| 2006/0161434 A1* | 7/2006 | Faisman | G10L 15/22 704/246 |
| 2008/0215320 A1* | 9/2008 | Wu | G10L 15/00 704/231 |
| 2008/0235018 A1 | 9/2008 | Eggen et al. | |
| 2008/0243504 A1* | 10/2008 | Poi | G10L 15/063 704/247 |
| 2015/0332670 A1* | 11/2015 | Akbacak | G06F 40/40 704/9 |
| 2016/0364382 A1* | 12/2016 | Sarikaya | G06F 40/253 |
| 2017/0206903 A1* | 7/2017 | Kim | G10L 15/30 |
| 2017/0213546 A1* | 7/2017 | Gilbert | G06F 40/30 |
| 2019/0130904 A1* | 5/2019 | Homma | G06N 3/0445 |

FOREIGN PATENT DOCUMENTS

| | | |
|---|---|---|
| CN | 107657048 A | 2/2018 |
| CN | 108153875 A | 6/2018 |
| CN | 109192194 A | 1/2019 |
| CN | 110489517 A | 11/2019 |
| JP | 2003058860 A | 2/2003 |
| JP | 2006058479 A | 3/2006 |
| JP | 2010079647 A | 4/2010 |
| JP | 2017049537 A | 3/2017 |
| JP | 2019101291 A | 6/2019 |
| WO | WO 2013170344 A1 | 11/2013 |

OTHER PUBLICATIONS

Chinese Patent Application No. 201910179796.4 English translation of First Office Action dated Sep. 23, 2020, 12 pages.
European Patent Application No. 20161452.6 extended Search and Opinion dated Aug. 10, 2020, 9 pages.
Japanese Patent Application No. 2020-041151 Office Action dated Mar. 16, 2021, 5 pages.
Japanese Patent Application No. 2020-041151 English translation of Office Action dated Mar. 16, 2021, 5 pages.

\* cited by examiner mining out pieces of data from user behavior logs associated with a target application, each piece of data comprising a first behavior log and a second behavior log, the first behavior log comprising a user speech and a corresponding speech recognition result, a second behavior log belonging to the same user as the first behavior log and time-dependent with the first behavior log — 101 determining the user speech and the corresponding speech recognition result in each piece of data as a positive feedback sample or a negative feedback sample, based on a relationship between the first behavior log and the second behavior log in the corresponding piece of data — 102

FIG. 1 mining out pieces of data from user behavior logs associated with a target application, each piece of data comprising a first behavior log and a second behavior log, the first behavior log comprising a user speech and a corresponding speech recognition result, a second behavior log belonging to the same user as the first behavior log and time-dependent with the first behavior log — 201 obtaining an anticipated user behavior corresponding to the first behavior log based on a type of the first behavior log — 202 in response to determining that the anticipated user behavior matches a user behavior recorded in the second behavior log, determining the user speech and the corresponding speech recognition result in the corresponding data as the positive feedback sample — 203

FIG. 2A

METHODS, COMPUTING DEVICES, AND STORAGE MEDIA FOR GENERATING TRAINING CORPUS

CROSS-REFERENCE TO RELATED APPLICATION

This application claims priority to and benefits of Chinese Patent Application Serial No. 201910179796.4 filed on Mar. 11, 2019, the entire content of which is incorporated herein by reference.

TECHNICAL FIELD

The present disclosure relates to the field of data processing technologies, and more particularly, to a method for generating a training corpus, a computing device, and a storage medium.

BACKGROUND

The optimization on the speech recognition model of the existing map application mainly requires the following: randomly extracting tens of thousands of hours of audios and their scene information; spending huge amounts of money and time for manual labeling on the extracted audios and scene information, to generate a training corpus; and re-training and tuning the speech recognition model based on the training corpus.

In the process of implementing the present disclosure, the inventors found that, in the related art, the training corpus for speech recognition mainly comes from the manually-labeled random audios, which leads to two main problems. One is that, the iteration period of the speech recognition model is too long due to manual labeling, and the resource consumption is severe. Another is that, there are a large number of invalid labeling since the audios are randomly extracted (it is more valuable to add false samples of the corpus than correct samples of the corpus).

SUMMARY

A first objective of the present disclosure is to provide a method for generating a training corpus, including: mining out pieces of data from user behavior logs associated with a target application, each piece of data including a first behavior log and a second behavior log, the first behavior log including a user speech and a corresponding speech recognition result, a second behavior log belonging to the same user as the first behavior log and time-dependent with the first behavior log; and determining the user speech and the corresponding speech recognition result in each piece of data as a positive feedback sample of the training corpus or a negative feedback sample of the training corpus, based on a relationship between the first behavior log and the second behavior log in the corresponding piece of data.

A second objective of the present disclosure is to provide a computing device including a memory, a processor, and computer programs stored on the memory and operative on the processor. When the programs are executed by the processor, the method for generating the training corpus according to the embodiments of the present disclosure is implemented.

A third objective of the present disclosure is to provide a computer-readable storage medium having computer programs stored thereon. The computer programs are executed by a processor, the method for generating the training corpus according to the embodiments of the present disclosure is implemented.

BRIEF DESCRIPTION OF THE DRAWINGS

FIG. 1 is a flowchart of a method for generating a training corpus according to an embodiment of the present disclosure.

FIG. 2A is a flowchart of a method for generating a training corpus according to an embodiment of the present disclosure.

DETAILED DESCRIPTION

Figure 2B:
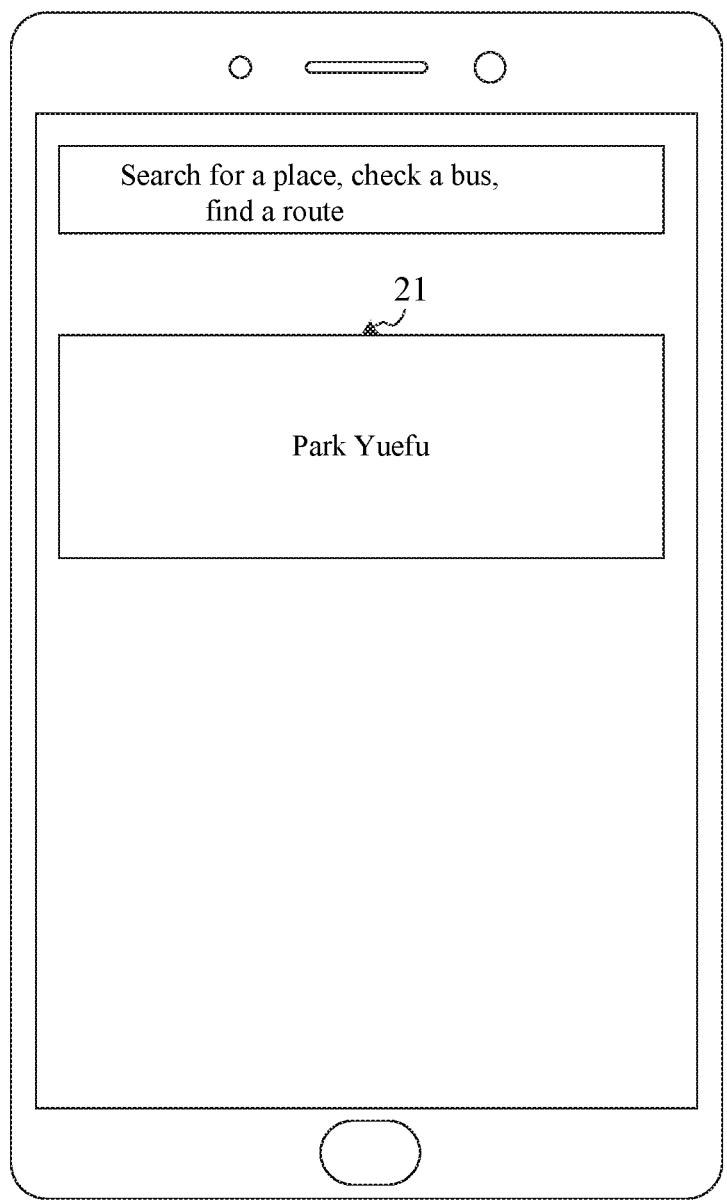
FIG. 2B is a schematic diagram of a speech input page for a user in a location search scenario according to an embodiment of the present disclosure.

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

Before discussing the exemplary embodiments in more detail, it should be noted that some exemplary embodiments are described as processes or methods depicted as flowcharts. Although the flowcharts describe various operations (or steps) as a sequential process, many of the operations may be implemented in parallel, concurrently or simultaneously. In addition, the order of operations may be rearranged. The processes may be terminated when the operations are completed, but may also have additional steps not included in the drawings. The processes may correspond to methods, functions, procedures, subroutines, and the like.

The main inventive concept of the embodiments of the present disclosure will be briefly described for the sake of easy understanding. First of all, the inventors are aiming at the first major problem in the related art. That is, the iteration period of the speech recognition model is too long due to manual labeling, and the resource consumption is relatively severe. It is considered whether the training corpus may be automatically mined out from audios and their texts recognized by the existing model based on user behaviors, without manual labeling, and the obtained training corpus is utilized directly for training. The training corpus may include a collection of training samples. The training samples may include positive feedback samples and negative feedback samples.

The inventors then addressed the second major problem in the related art. That is, there are a large number of invalid labeling since the audios are randomly extracted (it is more valuable to add false samples of the corpus than correct samples of the corpus). It is considered whether the training corpus for speech recognition maybe mined out in a targeted way, thus that the corpus mining may have two tasks: mining out the correctly-recognized samples and mining out the erroneously-recognized samples, namely mining out the positive feedback samples and the negative feedback samples.

Based on the above considering, the inventors creatively proposed to divide the corpus mining into two tasks: mining out the positive feedback samples and mining out the negative feedback samples. The mining out the positive feedback samples may include: mining out the audios and their texts correctly recognized through the existing speech recognition model based on user behaviors, without manual labeling, which is utilized directly for training the speech recognition model. The mining out the negative feedback samples may include: mining out the audios and their texts erroneously recognized through the existing speech recognition model based on user behaviors, to have manual labeling, to generate the training corpus. The advantage is that, first, the iteration period of the speech recognition model is greatly shortened, and significant resources are saved; the second is that the audios are extracted more specifically for manual labeling, so that the subsequent speech recognition model has the more effective iteration. Therefore, the training corpus for speech recognition may be automatically and purposefully mined out based on the historical behaviors of the users, and provided to the subsequent training on the speech recognition model, thereby further improving the speech recognition effect.

FIG. 1 is a flowchart of a method for generating a training corpus according to an embodiment of the present disclosure. This embodiment is applicable to a case of generating a training corpus for speech recognition. The method maybe implemented by an apparatus for generating a training corpus according to embodiments of the present disclosure. The apparatus maybe implemented by software and/or hardware, and integrated in a device for generating a training corpus in general. The device may include, but be not limited to, a computer. As illustrated in FIG. 1, the method in this embodiment includes the following acts.

At block 101, pieces of data are mined out from user behavior logs associated with a target application. Each piece of data includes: a first behavior log and a second behavior log. The first behavior log includes a user speech and a corresponding speech recognition result. The second behavior log belongs to the same user as the first behavior log and is time-dependent with the first behavior log.

Behavior data (for example, visiting, browsing, using speech, searching, clicking) generated each time the user uses the target application may be recorded in the user behavior log. As long as the user uses the target application, the user behavior log associated with the target application may be generated for recording the user behavior.

After the user uses the speech function in the target application, the first behavior log may be generated correspondingly. The first behavior log is configured to record the user behavior of using the speech, which may include the user speech and the corresponding speech recognition result.

The first behavior log and behavior logs of other users on the target application may be sequenced based on the users and the time. The user behavior log of the same user, associated with the time of the first behavior log is obtained as the second behavior log. For example, the user behavior log is determined as the second behavior log if this log is generated after the time of the first behavior log and has a time interval to the time of the first behavior log, the time interval is less than a preset time threshold, and this log belongs to the same user.

At block 102, the user speech and the corresponding speech recognition result in each piece of data are determined as a positive feedback sample or a negative feedback sample, based on a relationship between the first behavior log and the second behavior log in the corresponding piece of data.

The mining out the training corpus is divided into two specific tasks: mining out the positive feedback samples and mining out the negative feedback samples. The positive feedback samples may be the data correctly recognized. The negative feedback samples may be the data erroneously recognized.

After the user uses the speech function, he/she has a predictable sequential behavior, the speech recognition maybe considered as the correct this time. Thus, the mining out the positive feedback samples may include: obtaining an anticipated user behavior corresponding to the first behavior log based on a type of the first behavior log; and determining the user speech and the corresponding speech recognition result in the corresponding piece of data as the positive feedback sample in response to determining that the anticipated user behavior matches a user behavior recorded in the second behavior log.

In a specific example, the target application is a map application. If it is determined that the type of the first behavior log is utilizing the speech recognition result corresponding to the user speech as a destination for launching a location search service, it is determined that the anticipated user behavior is that the user selects an option of launching a route search service matching the destination in a search result page matching the location search service. When it is determined that the anticipated user behavior matches the user behavior recorded in the second behavior log, that is, the user behavior recorded in the second behavior log is selecting by the user the option of launching the route search service matching the destination in the search result page matching the location search service, the user speech and the corresponding speech recognition result in the data are determined as the positive feedback sample.

In another embodiment, the target application is a map application. If it is determined that the type of the first behavior log is utilizing the speech recognition result corresponding to the user speech as a destination for launching a route search service, it is determined that the anticipated user behavior is that the user selects an option of navigating to the destination in a route search page matching the route search service. When it is determined that the anticipated user behavior matches the user behavior recorded in the second behavior log, that is, it is determined that the user behavior recorded in the second behavior log is selecting by the user the option of navigating to the destination in the route search page matching the route search service, the user speech and the corresponding speech recognition result in the data are determined as the positive feedback sample.

In another embodiment, the target application is a map application. If it is determined that the type of the first behavior log is utilizing the speech recognition result corresponding to the user speech as a destination for launching a route navigation service, it is determined that the anticipated user behavior is that the user successfully arrives at the destination. When it is determined that the anticipated user behavior matches the user behavior recorded in the second behavior log, that is, the user behavior recorded in the second behavior log record is determined to be that the user successfully arrives at the destination, the user speech and the corresponding speech recognition result in the data are determined as the positive feedback sample.

After the user uses the speech function, he/she has a modification behavior in a short period of time, the text of the speech recognition for the first time may be considered wrong. There are two types of modification behaviors: re-inputting the modification using the speech function and inputting the modification manually. Therefore, mining out the negative feedback samples may include: if it is determined that the user behavior recorded in the second behavior log is a modification behavior on the user behavior recorded in the first behavior log within the preset period of time, it is determined that the user speech and the corresponding speech recognition result in the data are the negative feedback sample.

In a specific example, if it is determined that the user behavior recorded in the second behavior log is re-inputting a modification speech, and a modification recognition result corresponding to the modification speech and the speech recognition result satisfy a semantic association condition, the user behavior recorded in the second behavior log is determined as the modification behavior, and the user speech and the corresponding speech recognition result in the data are determined as the negative feedback sample. Or, if it is determined that the user behavior recorded in the second behavior log is inputting a modification text, and the modification text and the speech recognition result satisfy a semantic association condition, the user behavior recorded in the second behavior log is determined as the modification behavior, and the user speech and the corresponding speech recognition result in the data are determined as the negative feedback sample.

With the method for generating the training corpus provided in the embodiments of the present disclosure, the pieces of data which are, may be mined out from the user behavior logs associated with the target application, in which each piece of data includes: the first behavior log including the user speech and the corresponding speech recognition result, and the second behavior log belonging to the same user as the first behavior log and time-dependent with the first behavior log. The user speech and the corresponding speech recognition result in each piece of data may be determined as the positive feedback sample or the negative feedback sample based on the relationship between the first behavior log and the second behavior log in the corresponding piece of data which is. Therefore, it may solve the problems that the iteration period of the speech recognition model is too long and the resource consumption is sever due to that the training corpus for speech recognition is mainly derived from manually-labeled random audios, and there are a large number of invalid labeling since the audios are randomly extracted, in the related art. The positive feedback sample and negative feedback sample for speech recognition may be automatically and purposefully mined out based on user behaviors, for subsequent training on the speech recognition model, effectively improving the speech recognition effect, greatly shortening the iteration period of the speech recognition model, and saving significant resources.

FIG. 2A is a flowchart of a method for generating a training corpus according to an embodiment of the present disclosure. This embodiment may be combined with alternative schemes in one or more of the above embodiments. In this embodiment, determining the user speech and the corresponding speech recognition result in each piece of data as the positive feedback sample or the negative feedback sample based on the relationship between the first behavior log and the second behavior log in the corresponding piece of data, includes: obtaining an anticipated user behavior corresponding to the first behavior log based on a type of the first behavior log; and determining the user speech and the corresponding speech recognition result in the corresponding piece of data as the positive feedback sample in response to determining that the anticipated user behavior matches a user behavior recorded in the second behavior log.

Accordingly, as illustrated in FIG. 2A, the method in this embodiment may include the following acts.

At block 201, pieces of data are mined out from user behavior logs associated with a target application. Each piece of data includes: a first behavior log and a second behavior log. The first behavior log includes a user speech and a corresponding speech recognition result. The second behavior log belongs to the same user as the first behavior log and is time-dependent with the first behavior log.

At block 202, an anticipated user behavior corresponding to the first behavior log is obtained based on a type of the first behavior log.

After the user uses the speech function, he/she has a predictable sequential behavior, the speech recognition may be considered as the correct this time. The target application may include a map application.

Obtaining the anticipated user behavior corresponding to the first behavior log based on the type of the first behavior log may include: in response to determining that the type of the first behavior log is utilizing the speech recognition result corresponding to the user speech as a destination for launching a location search service, determining that the anticipated user behavior is selecting an option of launching a route search service that matches the destination in a search result page matching the location search service.

Figure 2C:
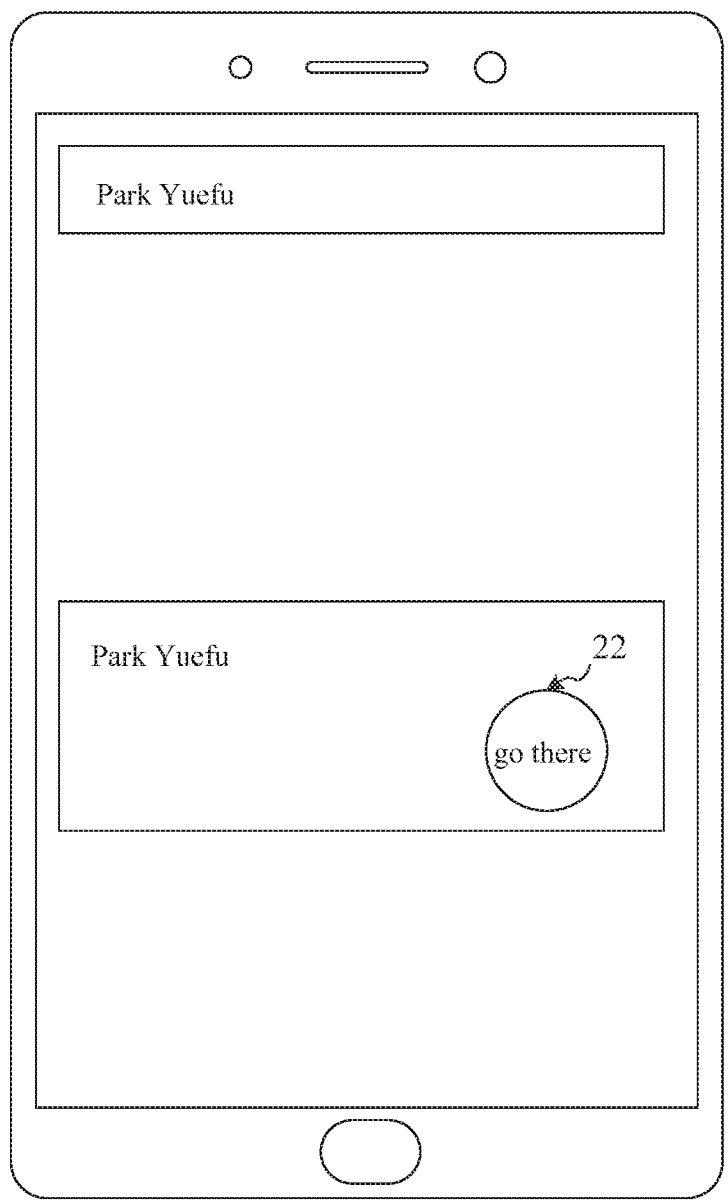
FIG. 2C is a schematic diagram of a search result page matching a location search service in a location search scenario according to an embodiment of the present disclosure.

For example, the user inputs a speech of "Park Yuefu" (as illustrated in FIG. 2B), and a speech recognition result, i.e., a text of "Park Yuefu" is obtained through speech recognition (a speech dynamic tag 21 displays the speech recognition result in real time). The user launches a location search request, and the search result page that matches the location search service is entered (as illustrated in FIG. 2C). The anticipated user behavior is clicking on a "go there" button 22 (see FIG. 2C) in the search result page.

Obtaining the anticipated user behavior corresponding to the first behavior log based on the type of the first behavior log may include: in response to determining that the type of the first behavior log is utilizing the speech recognition result corresponding to the user speech as a destination for launching a route search service, determining that the anticipated user behavior is selecting an option of navigating to the destination in a route search result page matching the route search service.

For example, the user inputs a speech of "go to Park Yuefu" (as illustrated in FIG. 2B), and a speech recognition result, i.e., a text of "go to Park Yuefu" is obtained through speech recognition (a speech dynamic tag 21 displays the speech recognition result in real time). The user launches a route search request, and the search result page that matches the route search service is entered (as illustrated in FIG. 2E). The anticipated user behavior is clicking on "start navigating" button 24 in the search result page (as illustrated in FIG. 2E).

Obtaining the anticipated user behavior corresponding to the first behavior log based on the type of the first behavior log may include: in response to determining that the type of the first behavior log is utilizing the speech recognition result corresponding to the user speech as a destination for launching a route navigation service, determining that the anticipated user behavior is a successful arrival of the user to the destination.

Figure 2D:
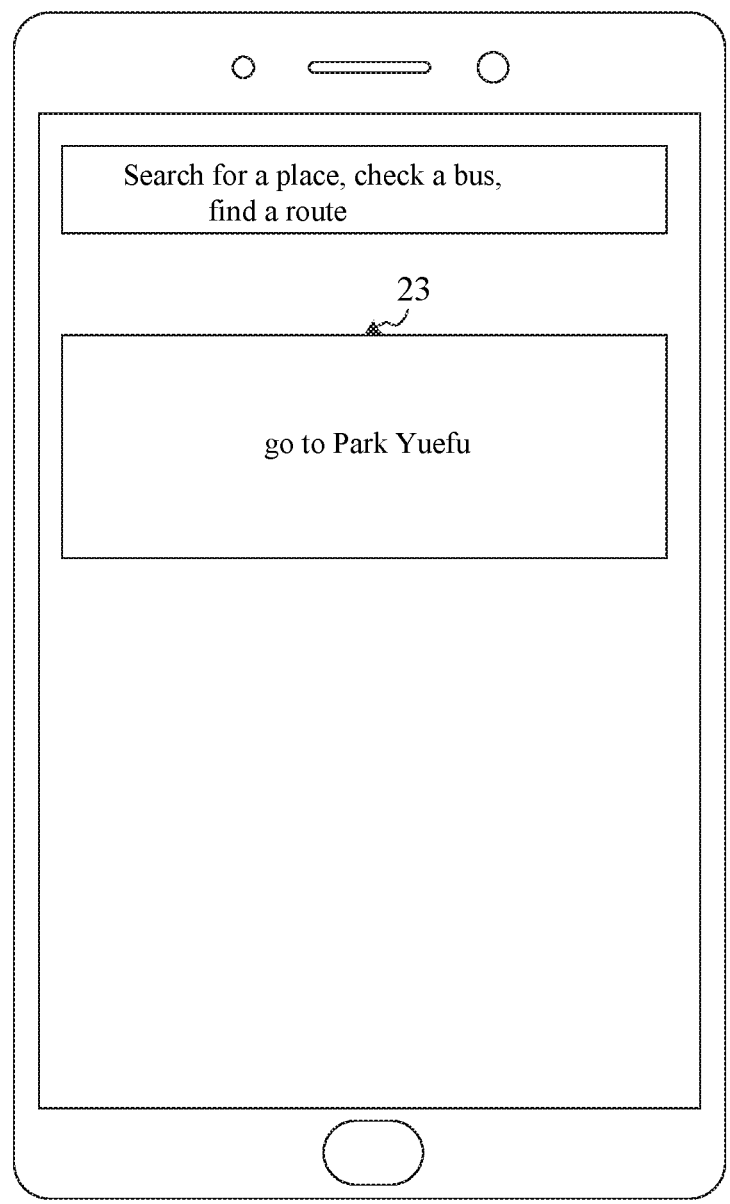
FIG. 2D is a schematic diagram of a speech input page for a user in a route search scenario according to an embodiment of the present disclosure.
Figure 2E:
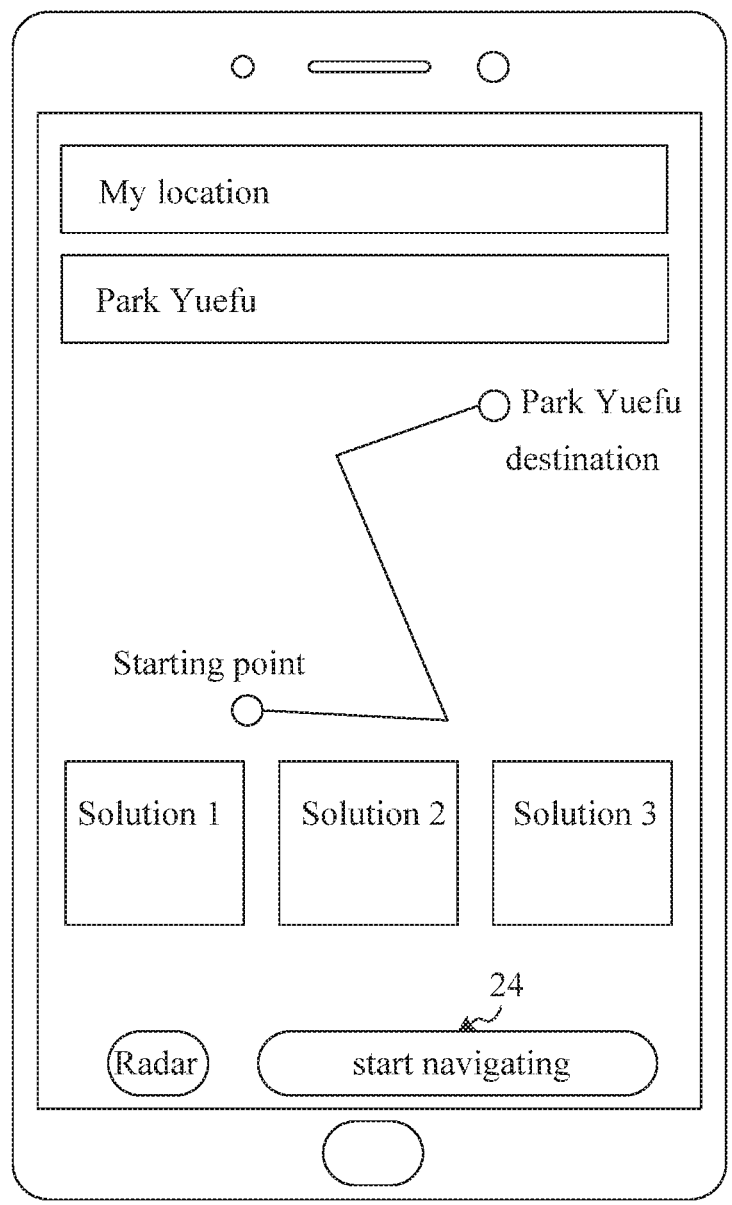
FIG. 2E is a schematic diagram of a search result page matching a route search service according to an embodiment of the present disclosure.
Figure 2F:
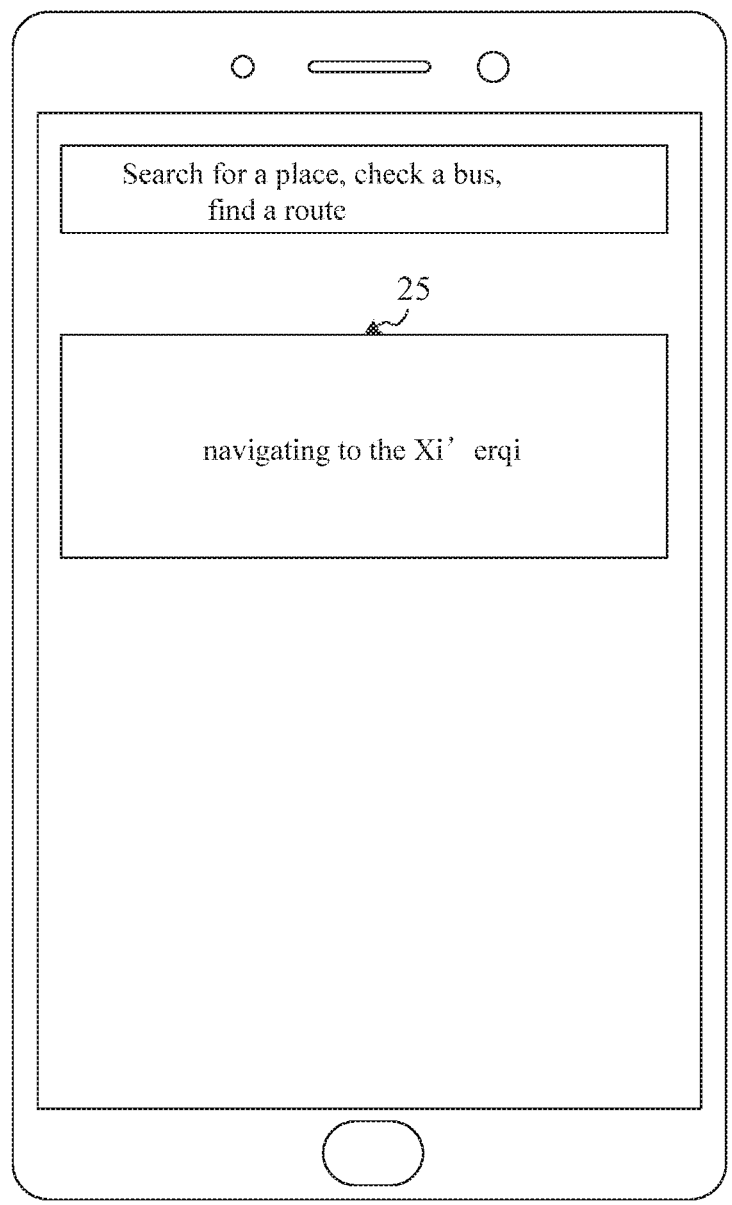
FIG. 2F is a schematic diagram of a speech input page for a user in a route navigation scenario according to an embodiment of the present disclosure.
Figure 2G:
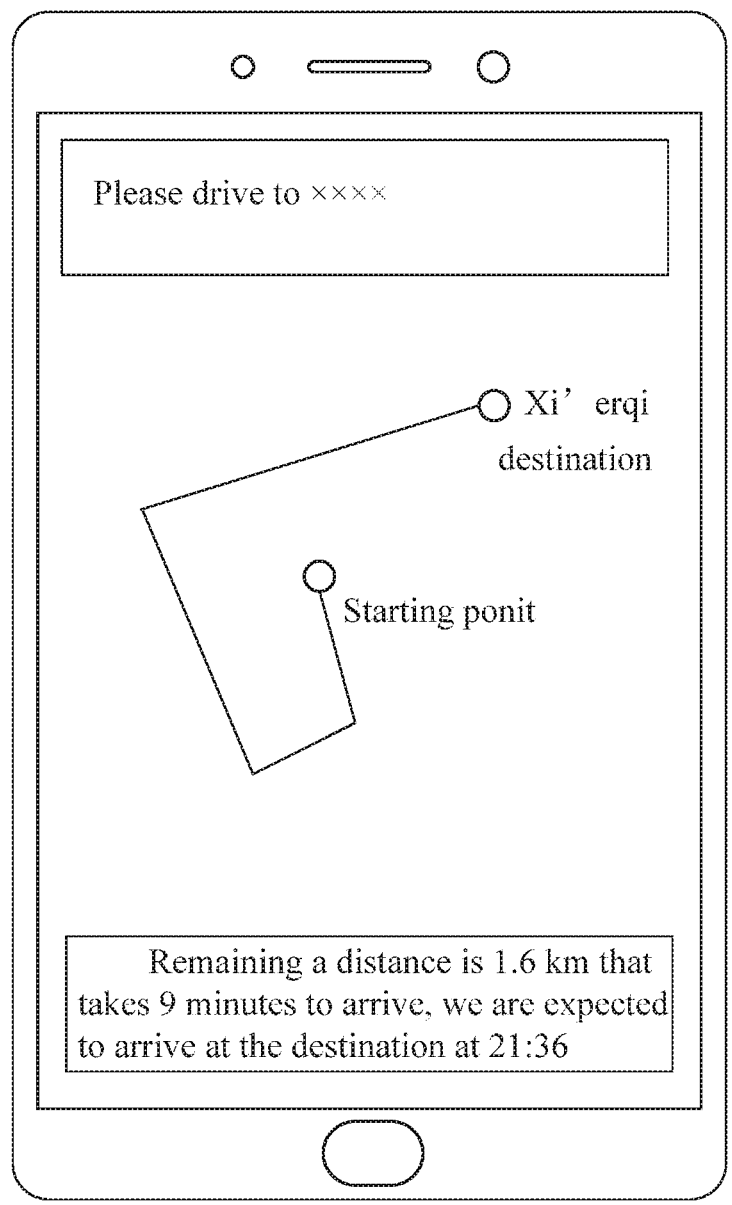
FIG. 2G is a schematic diagram of a navigation page in a route navigation scenario according to an embodiment of the present disclosure.
Figure 2H:
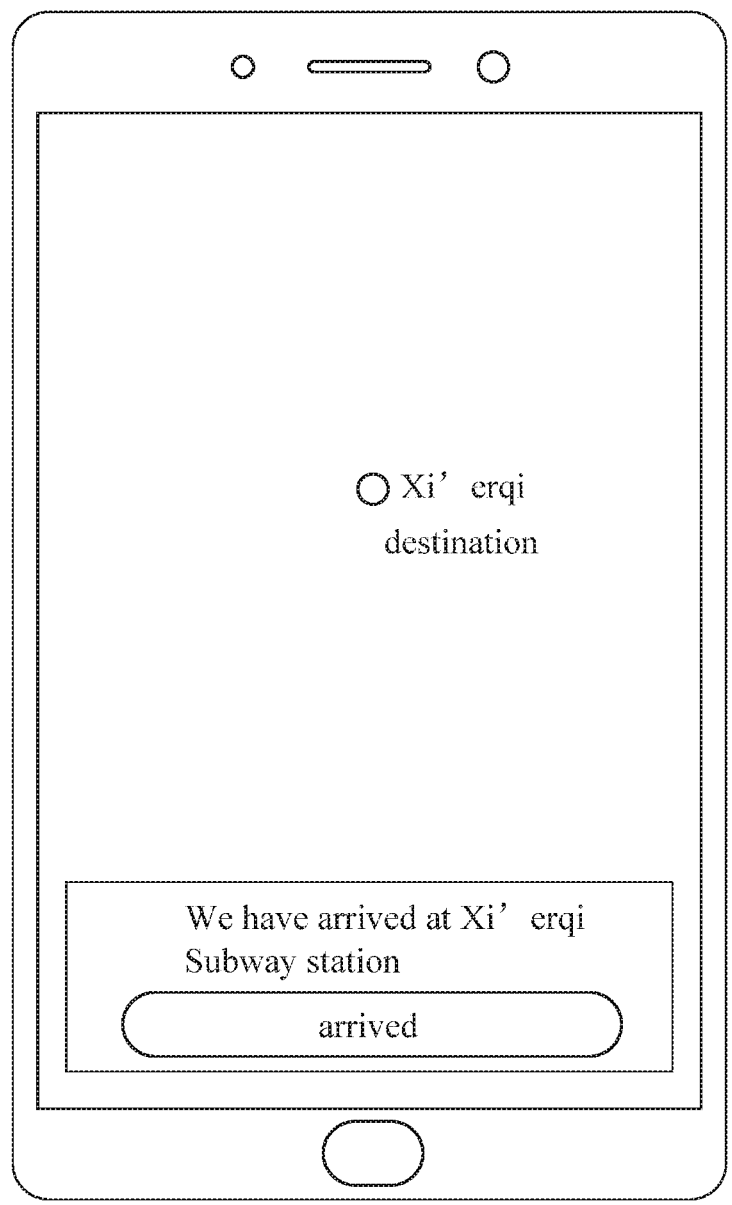
FIG. 2H is a schematic diagram of a page of navigating to a destination in a route navigation scenario according to an embodiment of the present disclosure.

For example, the user inputs a speech of "navigating to the Xi'erqi" (as illustrated in FIG. 2F), and a speech recognition result, i.e., a text of "navigating to the Xi'erqi" is obtained through speech recognition (a speech dynamic tag 25 displays the speech recognition result in real time). A route search request is launched, and a navigation page is visited (as illustrated in FIG. 2G). The anticipated user behavior is that the user successfully arrives at the destination (as illustrated in FIG. 2H).

At block 203, in response to determining that the anticipated user behavior matches the user behavior recorded in the second behavior log, the user speech and the corresponding speech recognition result in the corresponding piece of data are determined as the positive feedback sample.

In a specific example, when it is determined that the anticipated user behavior matches the user behavior recorded in the second behavior log, that is, the user behavior recorded in the second behavior log is selecting the option of launching the route search service matching with the destination in the search result page matching the location search service, the user speech and the corresponding speech recognition result in the data are determined as the positive feedback sample.

For example, the user inputs a speech of "Park Yuefu" (as illustrated in FIG. 2B), and a speech recognition result, i.e., a text of "Park Yuefu" is obtained through speech recognition (a speech dynamic tag 21 displays the speech recognition result in real time). The user launches a location search request, and the search result page that matches the location search service (as illustrated in FIG. 2C) is entered. The anticipated user behavior is clicking on a "go there" button 22 (see FIG. 2C) in the search result page. If the user behavior recorded in the second behavior log is that the user clicks on the "go there" button 22 (as illustrated in FIG. 2C), the route search service is launched, the search result page matching the route search service (as illustrated in FIG. 2E) is entered, the speech recognition result of the user speech is correct, and the user speech of "Park Yuefu" and the speech recognition result are determined as the positive feedback sample.

In another specific example, when it is determined that the anticipated user behavior matches the user behavior recorded in the second behavior log, that is, the user behavior recorded in the second behavior log is selecting the option of navigating to the destination in the route search result page matching the route search service, the user speech and the corresponding speech recognition result in the data are determined as the positive feedback sample.

For example, the user inputs a speech of "go to Park Yuefu" (as illustrated in FIG. 2D), and a speech recognition result, i.e., a text of "go to Park Yuefu" is obtained through speech recognition (a speech dynamic tag 23 displays the speech recognition result in real time). The user launches a route search request, and the search result page that matches the route search service (as illustrated in FIG. 2E) is entered. The anticipated user behavior is clicking on "start navigating" button 24 in the search result page (as illustrated in FIG. 2E). If the user behavior recorded in the second behavior log is that the user clicks on "start navigating" button 24 in the search result page, it is determined that the speech recognition result of the user speech is correct, then the user speech ""go to Park Yuefu"" and the speech recognition result are determined as the positive feedback sample.

In another specific example, when it is determined that the anticipated user behavior matches the user behavior recorded in the second behavior log, that is, the user behavior recorded in the second behavior log is that the user successfully arrives at the destination, the user speech and the corresponding speech recognition result in the data are determined to as the positive feedback sample.

For example, the user inputs a speech of "navigating to the Xi'erqi" (as illustrated in FIG. 2F), and a speech recognition result, i.e., a text of "navigating to the Xi'erqi" is obtained through speech recognition (a speech dynamic tag 25 displays the speech recognition result in real time). A route search request is launched, and the navigation page is visited (as illustrated in FIG. 2G). The anticipated user behavior is that the user successfully arrives at the destination (as illustrated in FIG. 2H). If the user behavior recorded in the second behavior log is that the user successfully arrives at the destination (as illustrated in FIG. 2H), the speech recognition result of the user speech is determined as correct, and the user speech "navigating to the Xi'erqi" and the speech recognition result are determined as the positive feedback sample.

With the method for generating the training corpus provided in the embodiments of the present disclosure, the anticipated user behavior corresponding to the first behavior log is obtained based on the type of the first behavior log, and the user speech and the corresponding speech recognition result in the data are determined as the positive feedback sample when it is determined that the anticipated user behavior matches the second behavior log. The positive feedback sample maybe automatically generated in the mining of the positive feedback sample, without manual labeling, and the iteration efficiency of the model is greatly improved.

Figure 3A:
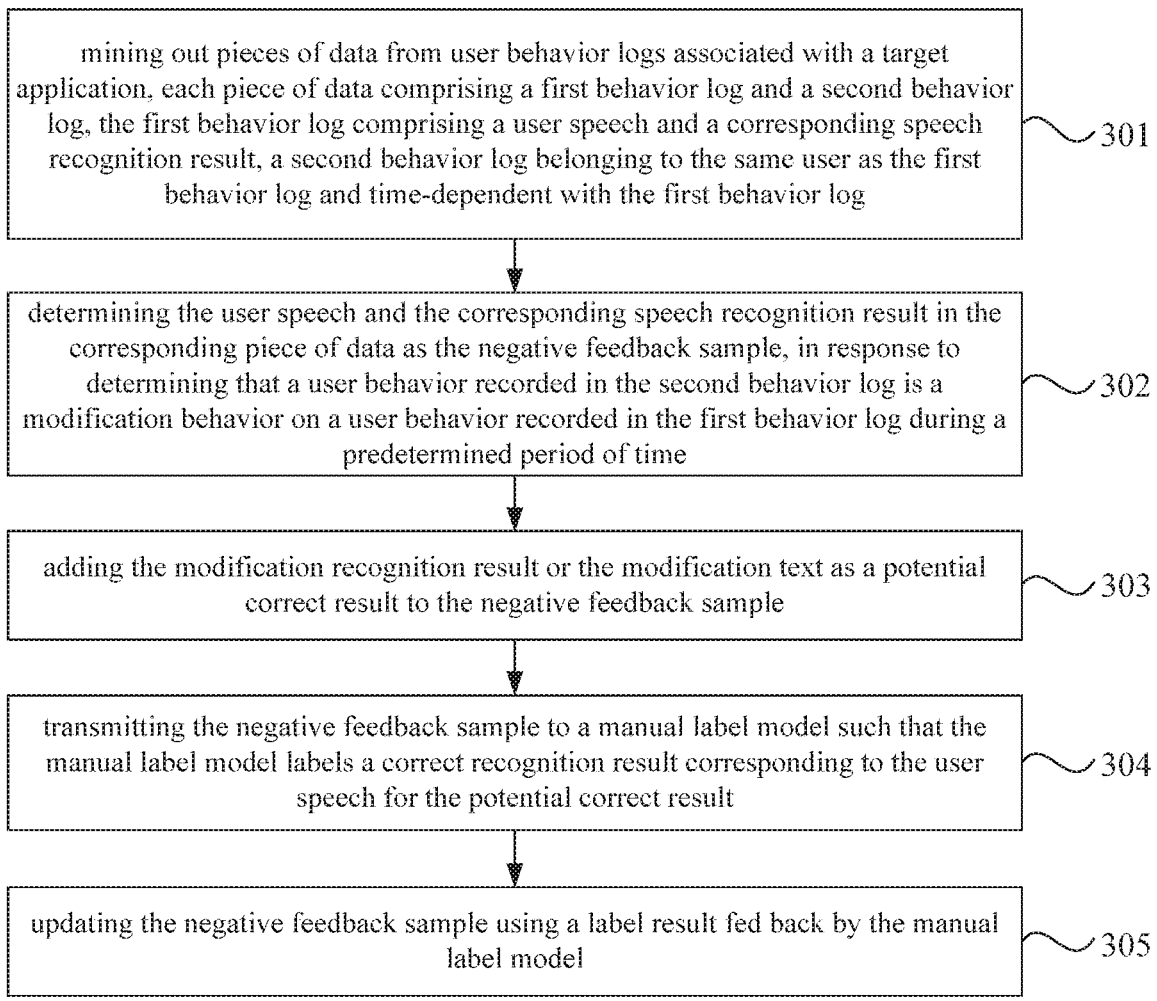
FIG. 3A is a flowchart of a method for generating a training corpus according to an embodiment of the present disclosure.

FIG. 3A is a flowchart of a method for generating a training corpus according to an embodiment of the present disclosure. This embodiment may be combined with alternative schemes in one or more of the above embodiments. In this embodiment, determining the user speech and the corresponding speech recognition result in each piece of data as the positive feedback sample or the negative feedback sample based on the relationship between the first behavior log and the second behavior log in the corresponding piece of data, includes: determining the user speech and the corresponding speech recognition result in the corresponding piece of data as the negative feedback sample, in response to determining that a user behavior recorded in the second behavior log is a modification behavior on a user behavior recorded in the first behavior log during a predetermined period of time.

After determining the user speech and the corresponding speech recognition result in each of piece of data as the negative feedback sample, the method may further include: adding the modification recognition result or the modification text as a potential correct result to the negative feedback sample; transmitting the negative feedback sample to a manual label model such that the manual label model labels a correct recognition result corresponding to the user speech for the potential correct result; and updating the negative feedback sample using a label result fed back by the manual label model.

Accordingly, as illustrated in FIG. 3A, the method in this embodiment may include the following acts.

At block 301, pieces of data are mined out from user behavior logs associated with a target application. Each piece of data includes: a first behavior log and a second behavior log. The first behavior log includes a user speech and a corresponding speech recognition result. The second behavior log belongs to the same user as the first behavior log and is time-dependent with the first behavior log.

At block 302, the user speech and the corresponding speech recognition result in the corresponding piece of data are determined as the negative feedback sample, in response to determining that a user behavior recorded in the second behavior log is a modification behavior on a user behavior recorded in the first behavior log during a predetermined period of time.

After the user uses the speech function, he/she has the modification behavior in a short period of time, the text of the speech recognition for the first time may be considered to be wrong. There are two types of modification behaviors: re-inputting modifications using the speech function and inputting modifications manually.

Determining that the user behavior recorded in the second behavior log is the modification behavior on the user behavior recorded in the first behavior log during the predetermined period of time, may include: in response to determining that the user behavior recorded in the second behavior log is re-inputting a modification speech, and a modification recognition result corresponding to the modification speech and the speech recognition result satisfy a semantic association condition, determining that the user behavior recorded in the second behavior log is the modification behavior.

The semantic association condition may include: the modification recognition result or the modification text is different from the speech recognition result, and the modification recognition result or the modification text and the speech recognition result satisfy a preset semantic similarity condition. In detail, the preset semantic similarity condition may be that a semantic similarity between the modification recognition result and the speech recognition result or between the modification text and the speech recognition result is greater than or equal to a preset similarity threshold.

Figure 3B:
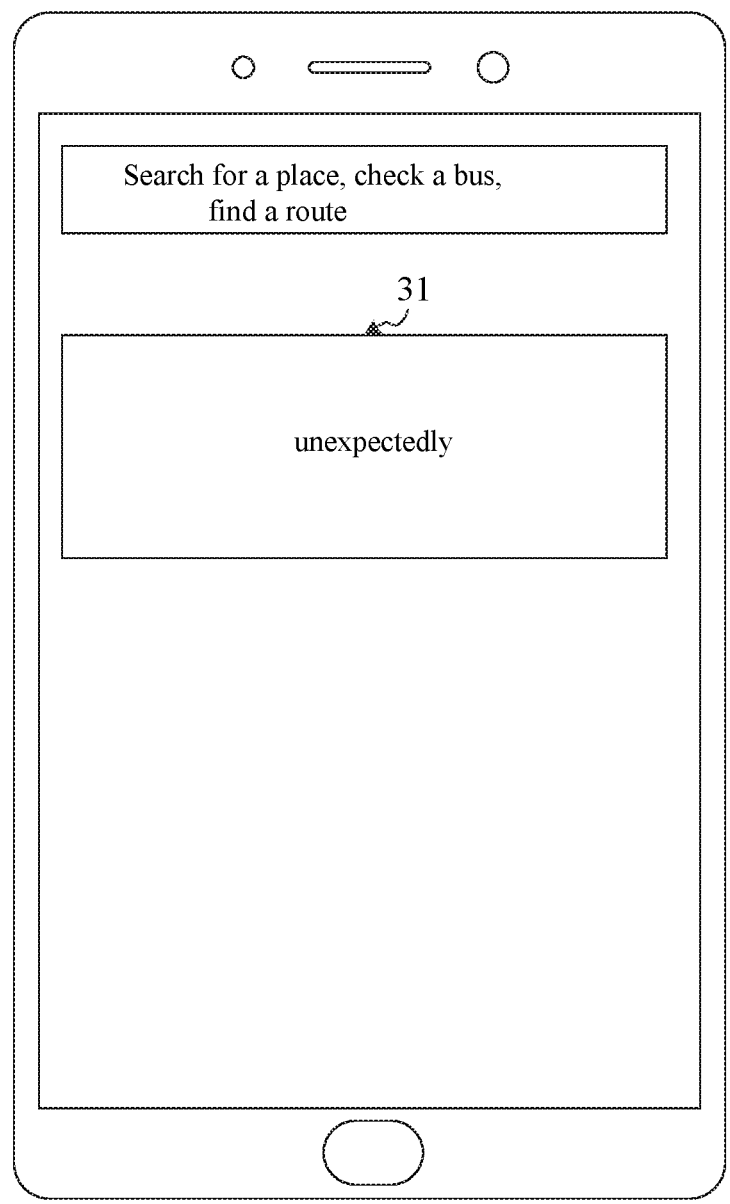
FIG. 3B is a schematic diagram of a speech input page for a user in a search scenario according to an embodiment of the present disclosure.
Figure 3C:
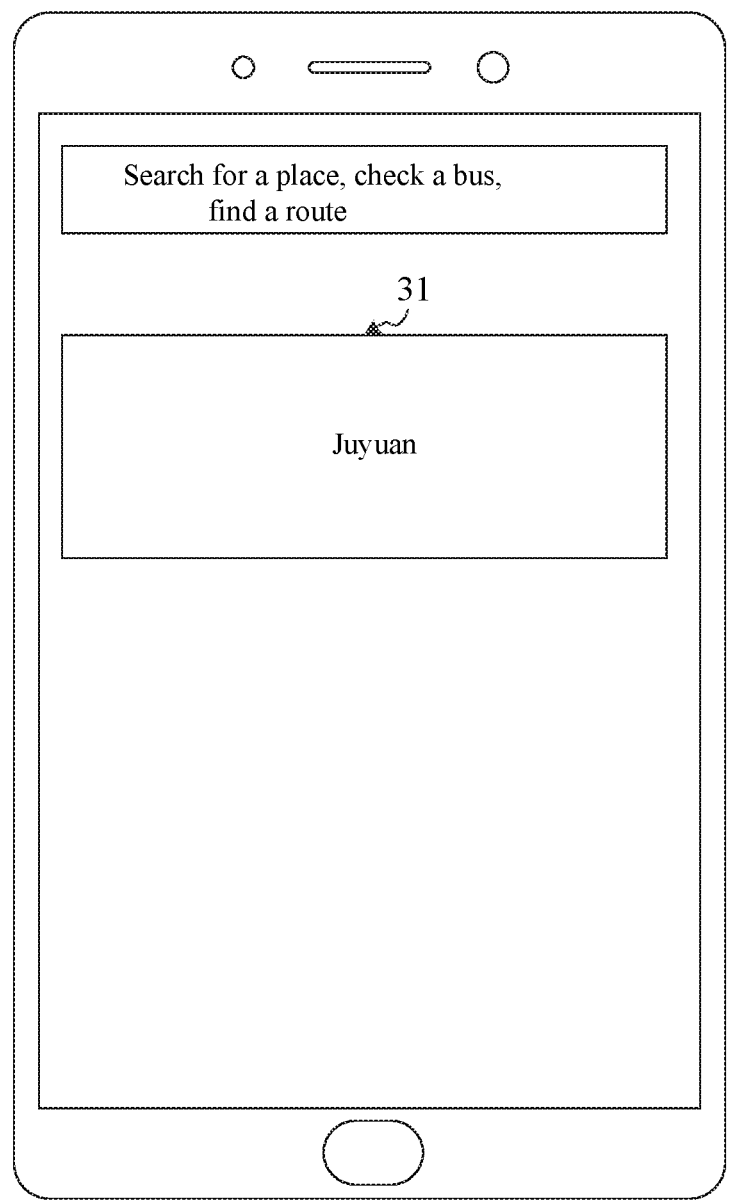
FIG. 3C is a schematic diagram of an input page of modification speeches in a search scenario according to an embodiment of the present disclosure.

For example, the user inputs a speech A of "Juyuan", and a speech recognition result, i.e., an erroneous text W "unexpectedly (since unexpectedly has the similar pronunciation with Juyuan in Chinese)" is obtained through speech recognition (a speech dynamic tag 31 displays the speech recognition result in real time). The route search request is launched (as illustrated in FIG. 3B). At this time, the user re-inputs a modification speech B of "Juyuan" using the speech function, and a modification recognition result corresponding to the modification speech, i.e., anew text R "Juyuan" is obtained through speech recognition (as illustrated in FIG. 3C, the speech dynamic tag 31 displays the speech recognition result in real time). A modification recognition result corresponding to the modification speech is obtained, that is, a new text R. When the text W and the text R are different, and the text W and the text R satisfy the preset semantic similarity condition, that is, the text W and the text R face are different in words but the semantic level of both are very similar, the speech recognition result of the user speech A is considered to be wrong. Then, user speech A, text W, and text R are used as the negative feedback sample.

Determining that the user behavior recorded in the second behavior log is the modification behavior on the user behavior recorded in the first behavior log during the predetermined period of time, may include: in response to determining that the user behavior recorded in the second behavior log is inputting a modification text, and the modification text and the speech recognition result satisfy a semantic association condition, determining that the user behavior recorded in the second behavior log is the modification behavior.

Figure 3D:
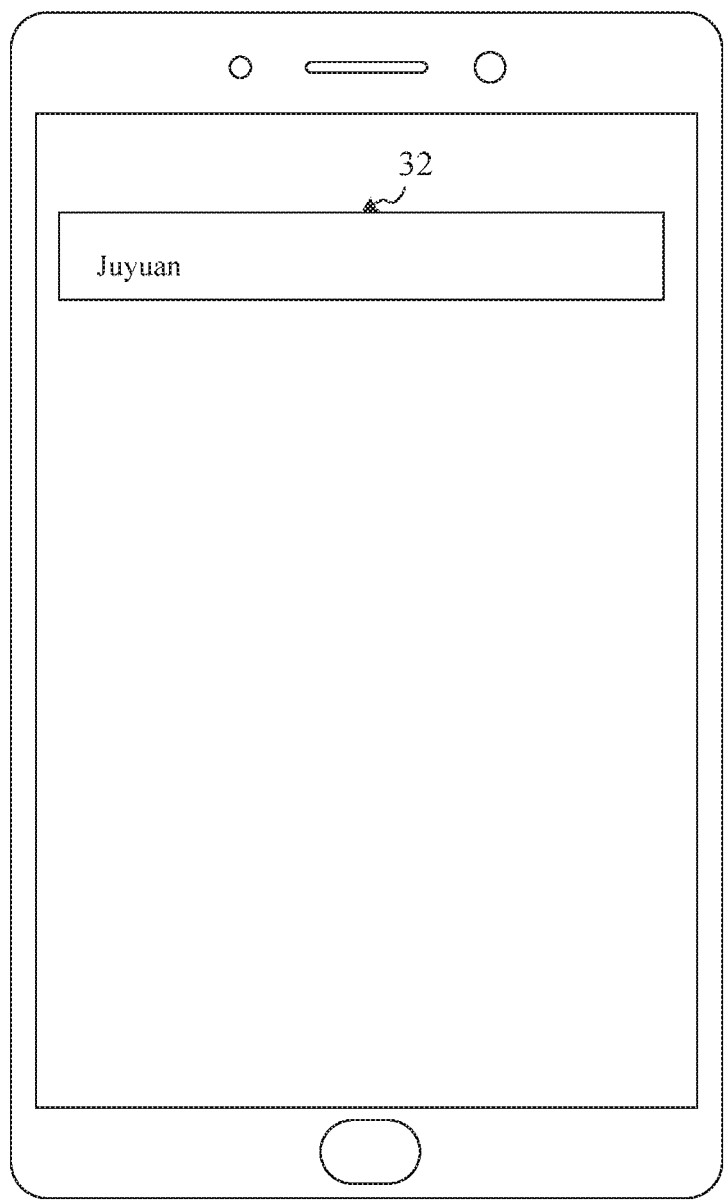
FIG. 3D is a schematic diagram of an input page of modification texts in a search scenario according to an embodiment of the present disclosure.

For example, the user inputs a speech A of "Juyuan", and a speech recognition result, i.e., an erroneous text W "unexpectedly" is obtained through speech recognition (a speech dynamic tag 31 displays the speech recognition result in real time). The route search request is launched (as illustrated in FIG. 3B). At this time, the user manually inputs a correct text "Juyuan" (as illustrated in FIG. 3D, a text input tab 32 displays the text input by the user manually in real time). A modification text, i.e., a new text R is obtained. When the text W and the text R are different, and the text W and the text R satisfy the preset semantic similarity condition, that is, the text W and the text R face are different in words but the semantic level of both are very similar, the speech recognition result of the user speech A is considered to be wrong. Then, the user speech A, text W, and text R are used as the negative feedback sample.

At block 303, the modification recognition result or the modification text are added as a potential correct result to the negative feedback sample.

The modification recognition result or the modification text may be the potential correct text corresponding to the user speech. The modification recognition result, the user speech, and the corresponding speech recognition result are added to the negative feedback sample. Or the modification text, the user speech, and the corresponding speech recognition result are added to the negative feedback sample.

At block 304, the negative feedback sample is transmitted to a manual label model such that the manual label model labels a correct recognition result corresponding to the user speech for the potential correct result.

The manual label model is configured to manually label the negative feedback sample with reference to the potential correct result. The manual label model labels the correct recognition result corresponding to the user speech for the potentially correct result. For example, for the potentially correct result "Juyuan", the correct recognition result corresponding to the user speech is "Juyuan".

At block 305, the negative feedback sample is updated using a label result fed back by the manual label model.

The negative feedback sample including the modification recognition result, the user speech, and the corresponding speech recognition result is updated to: the user speech, the corresponding speech recognition result, and a correct recognition result corresponding to the user speech, using the label result fed back by the manual label model. Or the negative feedback sample including the modification text, the user speech, and the corresponding speech recognition result is updated to: the user speech, the corresponding speech recognition result, and a correct recognition result corresponding to the user voice, using the label result fed back by the manual label model.

With the method for generating the training corpus provided in the embodiments of the present disclosure, after determining that the user behavior corresponding to the second behavior log is the modification behavior on the first behavior log during the predetermined period of time, the user speech and the corresponding speech recognition result in the data are determined as the negative feedback sample. The modification recognition result or the modification text is added as the potential correct result to the negative feedback sample, and the negative feedback sample is sent to the manual label model, such that the manual label model may label the correct recognition result corresponding to the user speech for the potential correct result. The negative feedback sample is updated by utilizing the label result fed back by the manual label model. Therefore, the training corpus is generated purposefully in the mining of the negative feedback sample. The speech recognition model is purposefully retrained by collecting the erroneous user speeches recognized by the existing speech recognition model, making the recognition of the speech recognition model more efficient, such that the extracted audios may be manually labeled in a targeted manner, and the subsequent iteration of the speech recognition model is more effective.

Figure 4A:
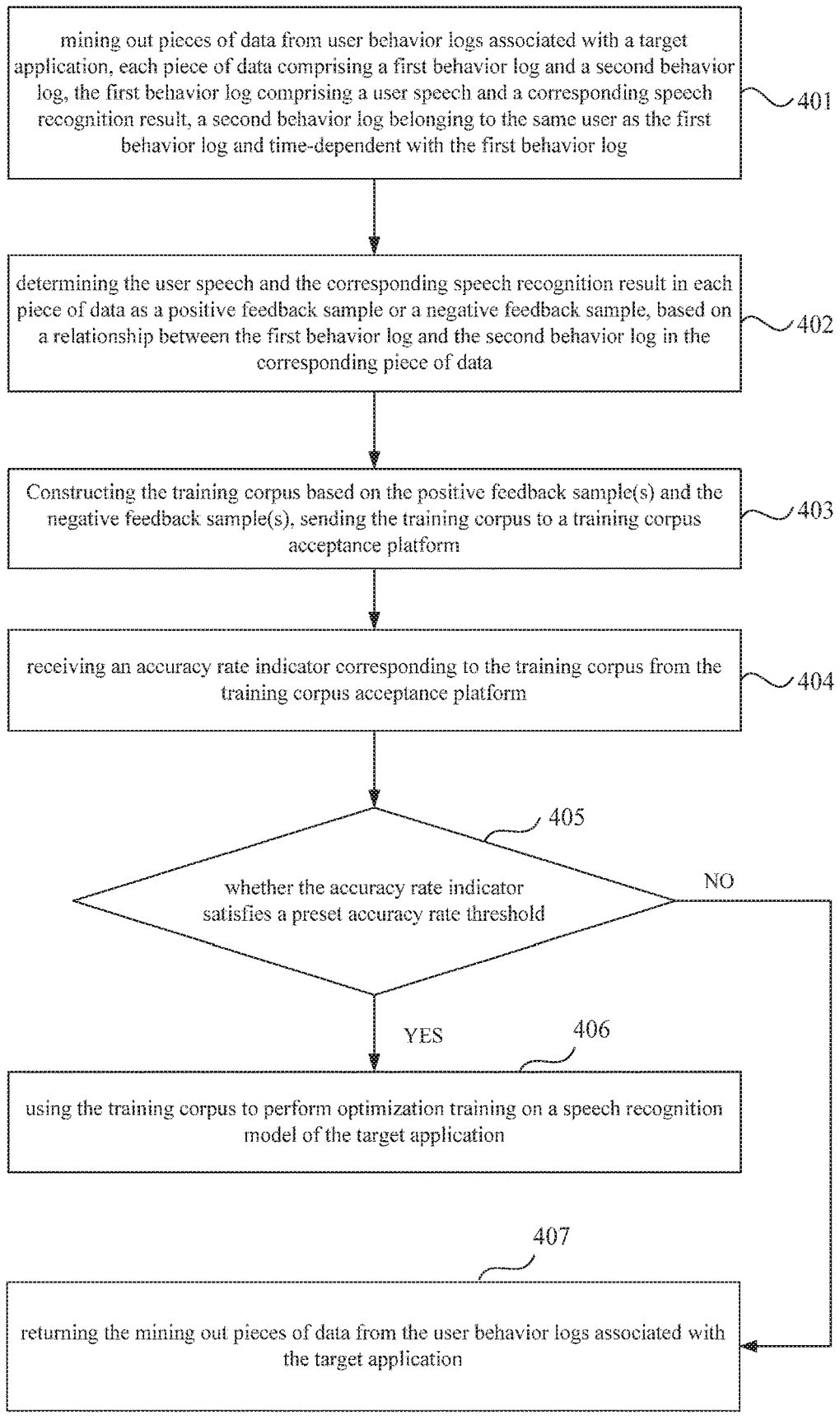
FIG. 4A is a flowchart of a method for generating a training corpus according to an embodiment of the present disclosure.

FIG. 4A is a flowchart of a method for generating a training corpus according to an embodiment of the present disclosure. This embodiment may be combined with alternative schemes in one or more of the above embodiments. In the embodiment, after determining the user speech and the corresponding speech recognition result in each piece of data as the positive feedback sample or the negative feedback sample, the method further includes: constructing a training corpus based on the positive feedback sample(s) and the negative feedback sample(s); sending the training corpus to a training corpus acceptance platform; receiving an accuracy rate indicator corresponding to the training corpus from the training corpus acceptance platform; and in response to determining that the accuracy rate indicator satisfies a preset accuracy rate threshold, using the training corpus to perform optimization training on a speech recognition model of the target application.

After receiving the accuracy rate indicator corresponding to the training corpus from the training corpus acceptance platform, the method further includes: in response to determining that the accuracy rate indicator does not satisfy the preset accuracy rate threshold, re-mining out pieces of new data from the user behavior logs associated with the target application, and determining a new positive feedback sample or negative feedback sample in the piece of new data.

Accordingly, as illustrated in FIG. 4A, the method in this embodiment may include the following acts.

At block 401, pieces of data are mined out from user behavior logs associated with a target application. Each piece of data includes: a first behavior log and a second behavior log. The first behavior log includes a user speech and a corresponding speech recognition result. The second behavior log belongs to the same user as the first behavior log and is time-dependent with the first behavior log.

At block 402, the user speech and the corresponding speech recognition result in each piece of data are determined as a positive feedback sample or a negative feedback sample, based on a relationship between the first behavior log and the second behavior log in the corresponding piece of data.

At block 403, a training corpus is constructed based on the positive feedback sample(s) and the negative feedback sample(s), and sent to a training corpus acceptance platform.

The training corpus acceptance platform is configured to check the positive feedback sample(s) and the negative feedback sample(s) in the training corpus.

At block 404, an accuracy rate indicator corresponding to the training corpus from the training corpus acceptance platform is received.

The training corpus acceptance platform determines whether each of the samples in the training corpus is accurate, and calculates the accuracy rate indicator correspondingly. The accuracy rate indicator may be a ratio of the number of samples determined to be accurate and the total number of samples in the training corpus.

For example, the total number of samples in the training corpus is 1000. The number of samples determined to be accurate is 900. The accuracy rate indicator is 0.9.

At block 405, it is determined whether the accuracy rate indicator satisfies a preset accuracy rate threshold. If yes, it goes to the act at block 406; otherwise, it goes to the act at block 407.

The preset accuracy rate threshold may be set based on requirements. For example, the preset accuracy rate threshold may be 0.8.

At block 406, the training corpus is used to perform optimization training on the speech recognition model of the target application.

If it is determined that the accuracy rate indicator satisfies the preset accuracy rate threshold, the training corpus is directly used to optimize the speech recognition model of the target application.

At block 407, pieces of new data are re-mined out from the user behavior logs associated with the target application, and a new positive feedback sample or negative feedback sample is determined in the piece of new data.

If it is determined that the accuracy rate indicator does not satisfy the preset accuracy rate threshold, the positive feedback sample and the negative feedback sample are re-mine out based on the user behavior logs associated with the target application. If the accuracy rate indicator of the re-mined positive feedback sample and negative feedback sample still do not satisfy the preset accuracy rate threshold, it continues to re-mine out the positive feedback sample and the negative feedback sample based on the user behavior logs associated with the target application until the positive feedback sample and negative feedback sample whose accuracy rate indicator satisfies the preset accuracy rate threshold is mined out.

Figure 4B:
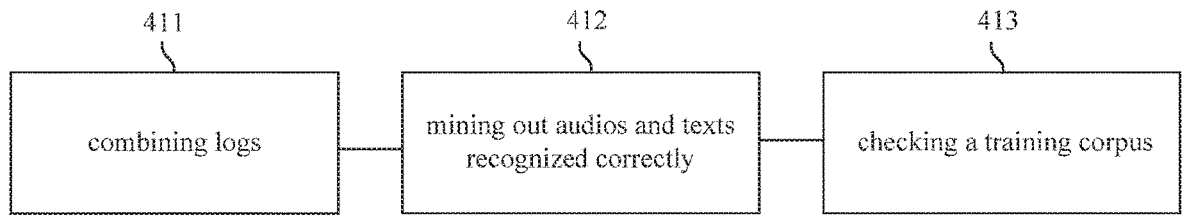
FIG. 4B is a flowchart of a method for mining out a positive feedback sample according to an embodiment of the present disclosure.

The overall flowchart of a method for mining out the positive feedback sample is illustrated in FIG. 4B, which includes the following acts.

At block 411, logs are combined in series.

Behavior logs of the user using the speech function and behavior logs of other users of the map are combined based on the users and the time.

At block 412, audios and texts recognized correctly are mined out.

The audios and texts recognized correctly by the existing model maybe mined out.

At block 413, a training corpus is checked.

Figure 4C:
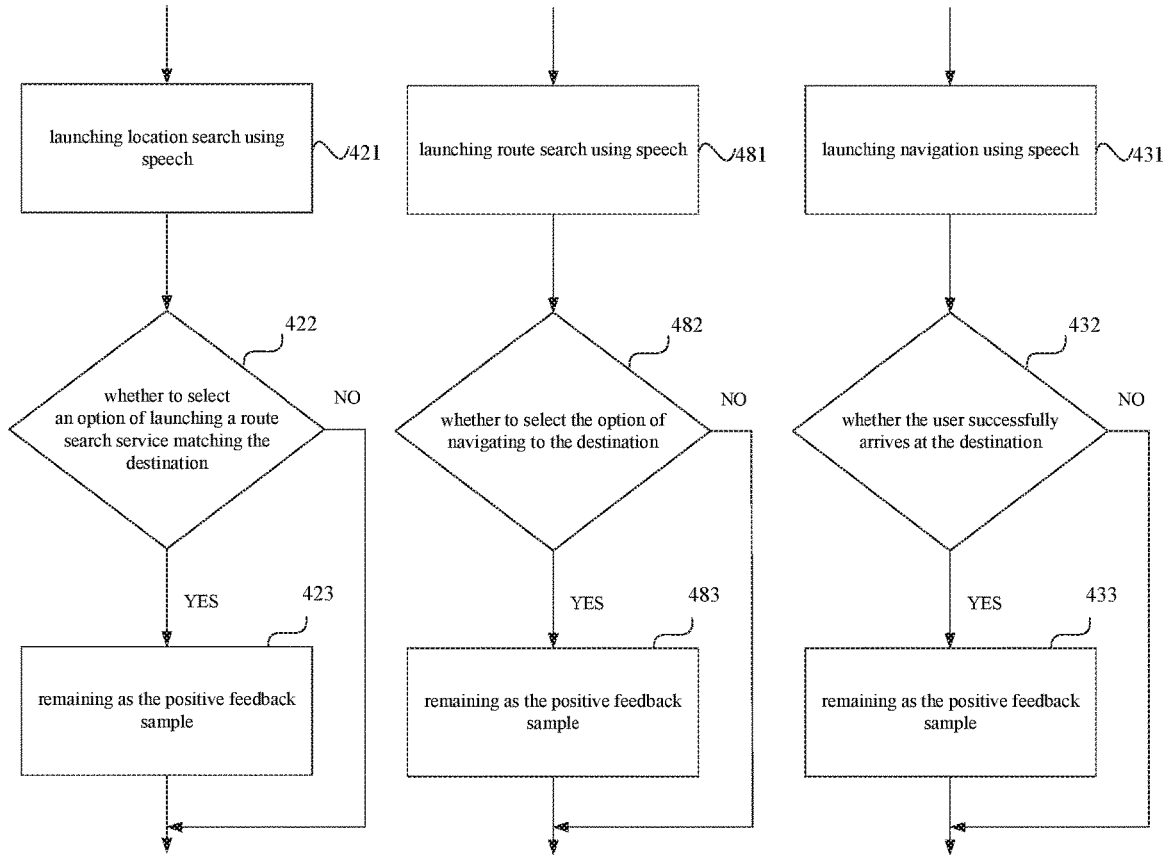
FIG. 4C is a flowchart of a method for mining out an audio and text recognized correctly by an existing model according to an embodiment of the present disclosure.

At block 412 (the most core process), the flowchart of the method of mining out the audios and texts recognized correctly by the existing model is illustrated in FIG. 4C (this figure illustrates, from left to right, location search scenario, route search scenario, and route navigation scenario).

A method for mining out the audios and texts recognized correctly by the existing model under the location search scenario, includes the following acts.

At block 421, a location search is launched using speech.

At block 422, it is determined whether to select an option of launching a route search service matching the destination, if yes, the act at block 423 is executed; if not, it skips the act at block 423 to perform the subsequent acts.

At block 423, it is remained as the positive feedback sample.

A method for mining out the audios and texts recognized correctly by the existing model under the route search scenario, includes the following acts.

At block 481, a route search is launched using speech.

At block 482, it is determined whether to select the option of navigating to the destination, if yes, it proceeds to the act at block 483; if not, it skips the act at block 483 to perform the subsequent acts.

At block 483, it is remained as the positive feedback sample.

A method for mining out the audios and texts recognized correctly by the existing model under the route navigation scenario, includes the following acts.

At block 431, a navigation is launched using speech.

At block 432, it is determined whether the user successfully arrives at the destination, if yes, the act at block step 433 is performed; if not, it skips the act at block 433 to perform the subsequent acts.

At block 433, it is remained as the positive feedback sample.

Figure 4D:
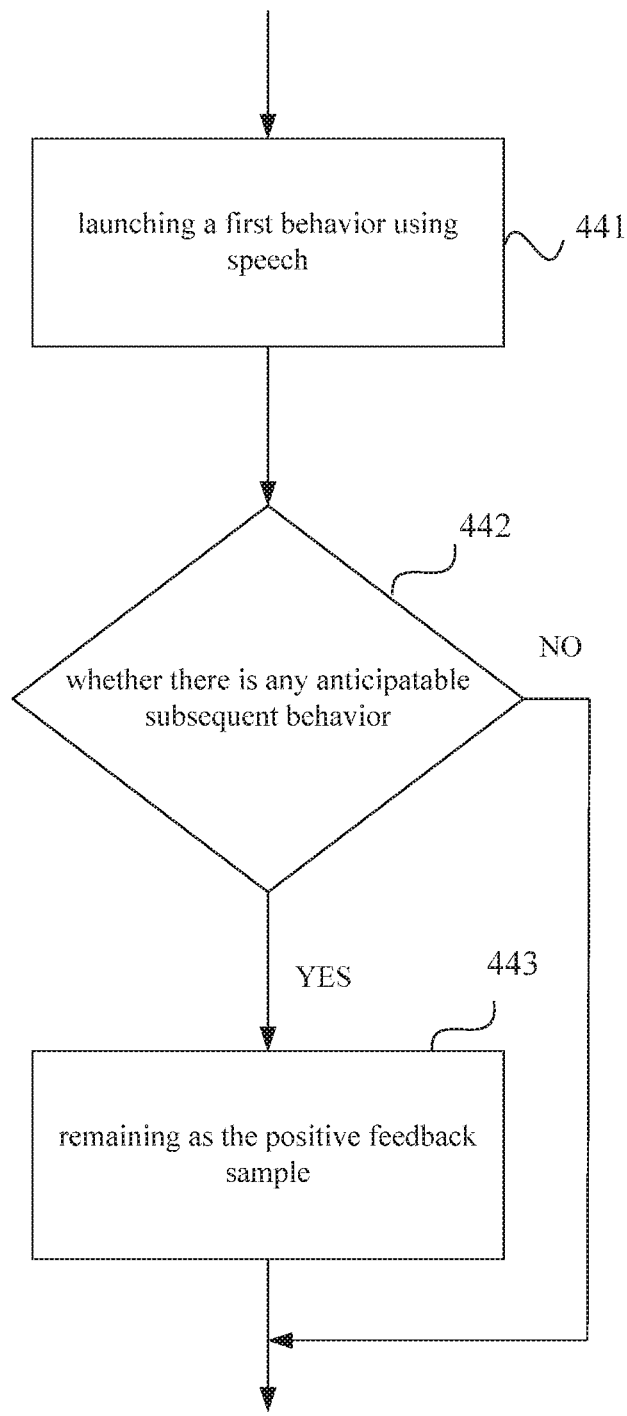
FIG. 4D is a flowchart of a core logic of a method for mining out an audio and text recognized correctly by an existing model according to an embodiment of the present disclosure.

A core logic of a method for mining out the audios and texts recognized correctly by the existing model is further abstracted as illustrated in FIG. 4D, which includes the following acts.

At block 441, a first behavior is launched by speech.

At block 442, it is determined whether there is any anticipatable subsequent behavior, if yes, it goes to the act at block 443; if no, it skips the act at block 443 to perform the next acts.

At block 443, it is remained as the positive feedback sample.

Figure 4E:
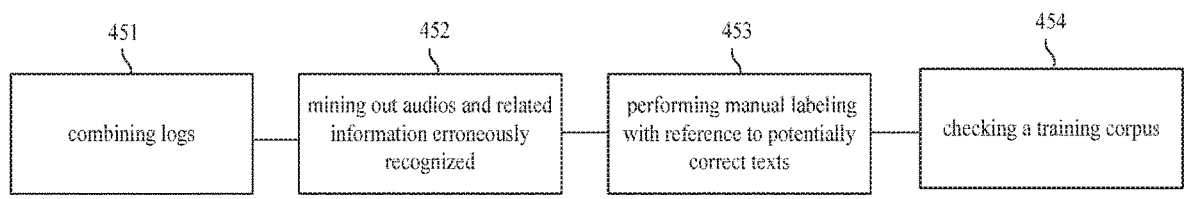
FIG. 4E is a flowchart of a method for mining out a negative feedback sample according to an embodiment of the present disclosure.

The overall flowchart of a method of mining out the negative feedback sample of the training corpus is illustrated in FIG. 4E, which includes the following acts.

At block 451, logs are combined in series.

At block 452, audios and related information erroneously recognized are mined out.

At block 453, manual labeling is performed with reference to potentially correct texts.

At block 454, a training corpus is checked.

Figure 4F:
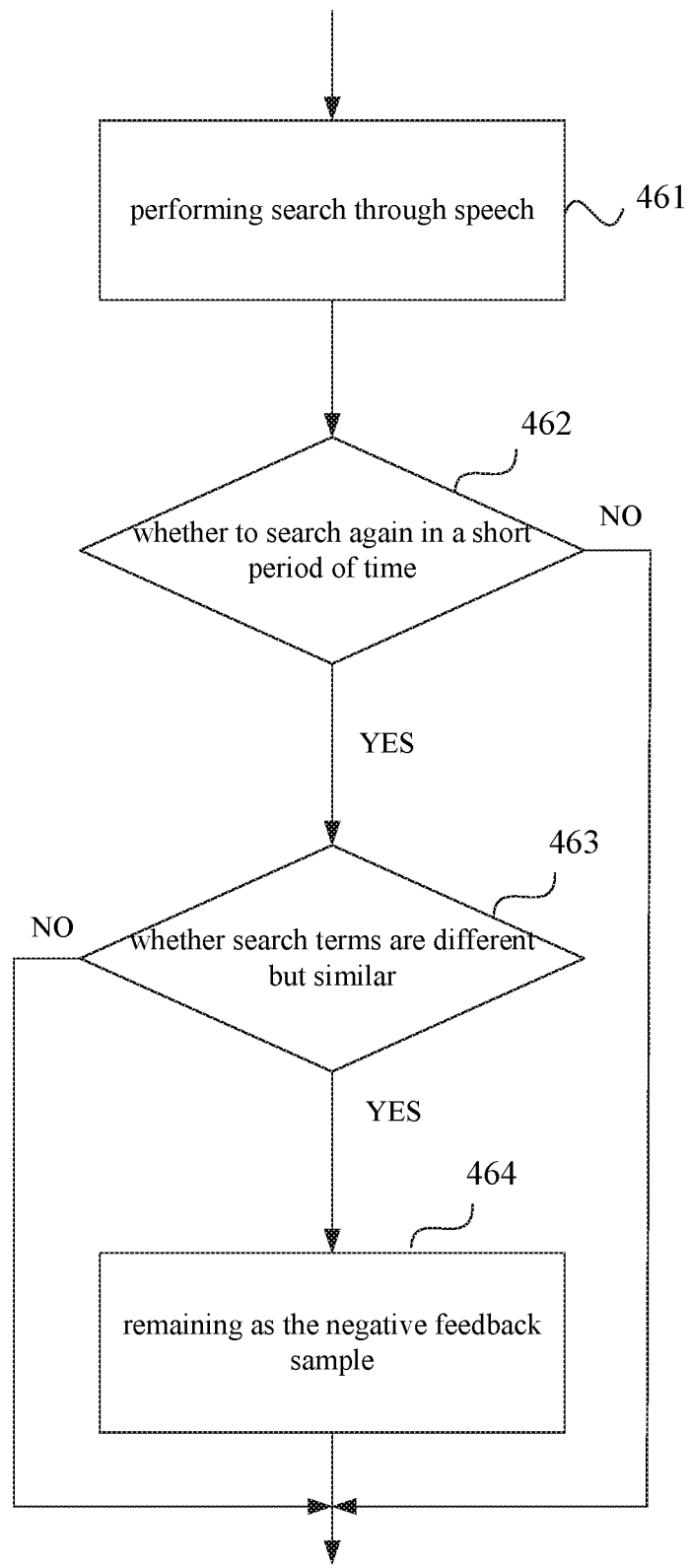
FIG. 4F is a flowchart of a method for mining out an audio and text recognized erroneously by an existing model and a potentially-correct text according to an embodiment of the present disclosure.

At block 452 (the most core process), the flowchart of a method of mining out audios and texts erroneously recognized by the existing model and potentially-correct texts as illustrated in FIG. 4F (taking the search scenario as an example), includes the following acts.

At block 461, search is performed through speech.

At block 462, it is determined whether to search again in a short period of time, if yes, it proceeds to the act at block 463; if not, it skips the acts at blocks 463 and 464 to perform subsequent acts.

At block 463, it is determined whether search terms are different but similar is determined, if yes, the act at block 464 is performed; if not, the act at block 464 is skipped to perform the subsequent acts.

At block 464, it is remained as the negative feedback sample.

Figure 4G:
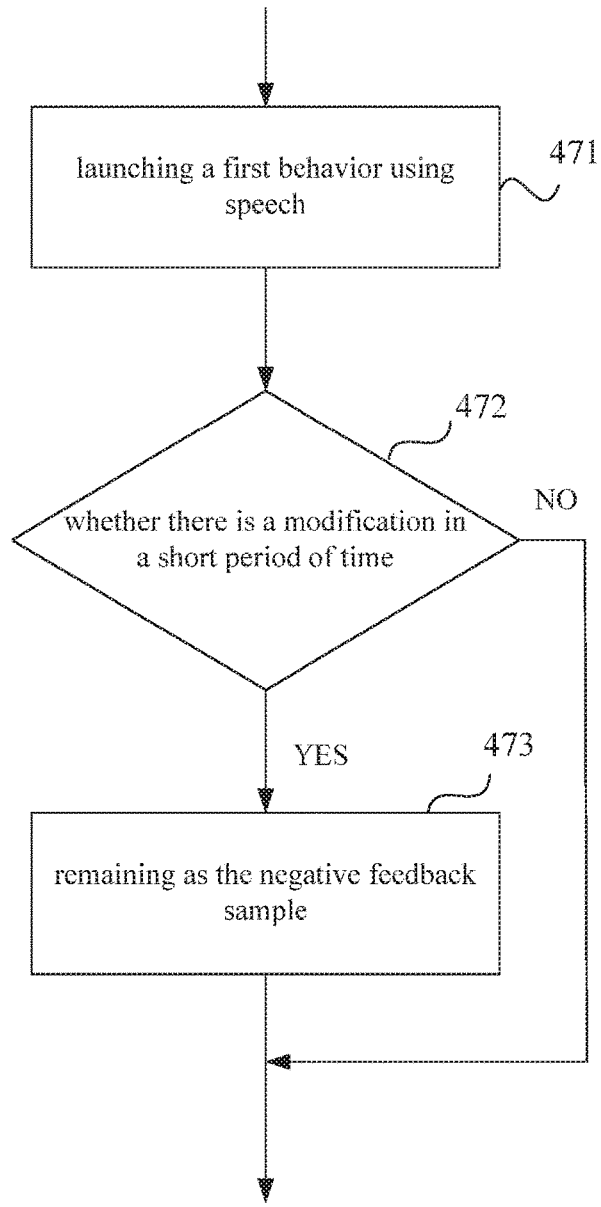
FIG. 4G is a flowchart of a core logic of a method for mining out an audio and text recognized erroneously by an existing model and a potentially-correct text according to an embodiment of the present disclosure.

A core logic of a method of mining out audios and texts erroneously recognized by the existing model and potentially-correct texts is illustrated as FIG. 4G, which includes the following acts.

At block 471, a first behavior is launched by speech.

At block 472, it is determined whether there is a modification in a short period of time, if yes, the act at block 473 is performed; if not, the act at block 473 is skipped to perform the subsequent acts.

At step 473, it is remained as the negative feedback sample.

With the method for generating the training corpus provided in the embodiments of the present disclosure, the training corpus is constructed based on the positive feedback sample(s) and the negative feedback sample(s). The training corpus is sent to the training corpus acceptance platform. The accuracy rate indicator corresponding to the training corpus fed back by the training corpus acceptance platform is received. When it is determined that the accuracy rate indicator satisfies the preset accuracy rate threshold, the training corpus is used to perform optimization training on the speech recognition model of the target application, otherwise, new positive feedback sample(s) and negative feedback sample(s) are mined out based on user behavior logs associated with the target application, and then the generated training corpus is checked again, thereby providing an accurate training corpus for the speech recognition model, and more effectively improving the of speech recognition effect.

Figure 5:
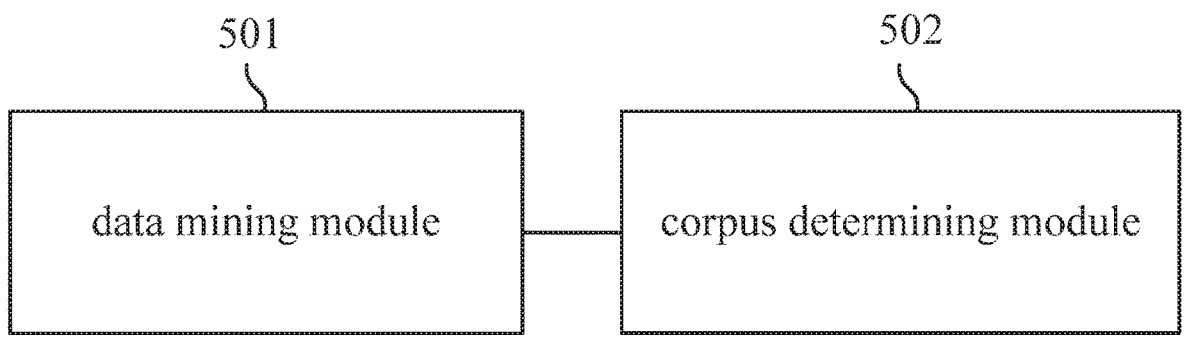
FIG. 5 is a schematic diagram of an apparatus for generating a training corpus according to an embodiment of the present disclosure.

FIG. 5 is a schematic diagram of an apparatus for generating a training corpus according to an embodiment of the present disclosure. As illustrated in FIG. 5, the apparatus includes a data mining module 510, and a corpus determining module 502.

The data mining module 501 is configured to mine out pieces of data from user behavior logs associated with a target application, each piece of data including a first behavior log and a second behavior log, the first behavior log including a user speech and a corresponding speech recognition result, a second behavior log belonging to the same user as the first behavior log and time-dependent with the first behavior log. The corpus determining module 502 is configured to determine the user speech and the corresponding speech recognition result in each piece of data as a positive feedback sample or a negative feedback sample, based on a relationship between the first behavior log and the second behavior log in the corresponding piece of data.

With the apparatus for generating the training corpus provided in the embodiments of the present disclosure, the pieces of data which are, may be mined out from the user behavior logs associated with the target application, in which each piece of data includes: the first behavior log including the user speech and the corresponding speech recognition result, and the second behavior log belonging to the same user as the first behavior log and time-dependent with the first behavior log. The user speech and the corresponding speech recognition result in each piece of data may be determined as the positive feedback sample or the negative feedback sample based on the relationship between the first behavior log and the second behavior log in the corresponding piece of data which is. Therefore, it may solve the problems that the iteration period of the speech recognition model is too long and the resource consumption is sever due to that the training corpus for speech recognition is mainly derived from manually-labeled random audios, and there are a large number of invalid labeling since the audios are randomly extracted, in the related art. The positive feedback sample and negative feedback sample for speech recognition may be automatically and purposefully mined out based on user behaviors, for subsequent training on the speech recognition model, effectively improving the speech recognition effect, greatly shortening the iteration period of the speech recognition model, and saving significant resources.

On the basis of the above embodiments, the corpus determining module 502 may include: an anticipated behavior obtaining unit, configured to obtain an anticipated user behavior corresponding to the first behavior log, based on a type of the first behavior log; and a first determining unit, configured to determine the user speech and the corresponding speech recognition result in the corresponding piece of data as the positive feedback sample, in response to determining that the anticipated user behavior matches a user behavior recorded in the second behavior log.

On the basis of the foregoing embodiments, the corpus determining module 502 may include: a second determining unit, configured to: determine the user speech and the corresponding speech recognition result in the corresponding piece of data as the negative feedback sample, in response to determining that a user behavior recorded in the second behavior log is a modification behavior on a user behavior recorded in the first behavior log during a predetermined period of time.

On the basis of the above embodiments, a target application may include a map application.

On the basis of the above embodiments, the anticipated behavior obtaining unit may include: a first determining subunit, configured to, in response to determining that the type of the first behavior log is utilizing the speech recognition result corresponding to the user speech as a destination for launching a location search service, determine that the anticipated user behavior is selecting an option of launching a route search service that matches the destination in a search result page matching the location search service.

On the basis of the above embodiments, the anticipated behavior obtaining unit may include: a second determining subunit, configured to, in response to determining that the type of the first behavior log is utilizing the speech recognition result corresponding to the user speech as a destination for launching a route search service, determine that the anticipated user behavior is selecting an option of navigating to the destination in a route search result page matching the route search service.

On the basis of the above embodiments, the anticipated behavior obtaining unit may include: a third determining subunit, configured to, in response to determining that the type of the first behavior log is utilizing the speech recognition result corresponding to the user speech as a destination for launching a route navigation service, determine that the anticipated user behavior is a successful arrival of the user to the destination.

On the basis of the above embodiments, the second determining unit may include: a third determining subunit, configured to, in response to determining that the user behavior recorded in the second behavior log is re-inputting a modification speech, and a modification recognition result corresponding to the modification speech and the speech recognition result satisfy a semantic association condition, determine that the user behavior recorded in the second behavior log is the modification behavior; and/or in response to determining that the user behavior recorded in the second behavior log is inputting a modification text, and the modification text and the speech recognition result satisfy a semantic association condition, determine that the user behavior recorded in the second behavior log is the modification behavior.

On the basis of the above embodiments, the semantic association condition includes: the modification recognition result or the modification text is different from the speech recognition result, and the modification recognition result or the modification text and the speech recognition result satisfy a preset semantic similarity condition.

On the basis of the above embodiments, the second determining unit may include: a result adding subunit, configured to add the modification recognition result or the modification text as a potential correct result to the negative feedback sample; a result labeling subunit, configured to transmit the negative feedback sample to a manual label model such that the manual label model labels a correct recognition result corresponding to the user speech for the potential correct result; and a corpus updating subunit, configured to update the negative feedback sample using a label result fed back by the manual label model.

On the basis of the above embodiments, the device may further include: a set transmitting module, configured to construct a training corpus based on the positive feedback sample(s) and the negative feedback sample(s), and send the training corpus to a training corpus acceptance platform; an indicator receiving module, configured to receive an accuracy rate indicator corresponding to the training corpus from the training corpus acceptance platform; and a corpus set adopting module, configured to, in response to determining that the accuracy rate indicator satisfies a preset accuracy rate threshold, use the training corpus to perform optimization training on a speech recognition model of the target application.

On the basis of the above embodiments, the device may further include: a corpus regeneration module, configured to, in response to determining that the accuracy rate indicator does not satisfy the preset accuracy rate threshold, re-mine out pieces of new data from the user behavior logs associated with the target application, and determining a new positive feedback sample or negative feedback sample in the piece of new data.

The above-mentioned apparatus for generating the training corpus may execute the method for generating the training corpus provided in any embodiment of the present disclosure, and has the corresponding functional modules and beneficial effects of executing the method for generating the training corpus.

Figure 6:
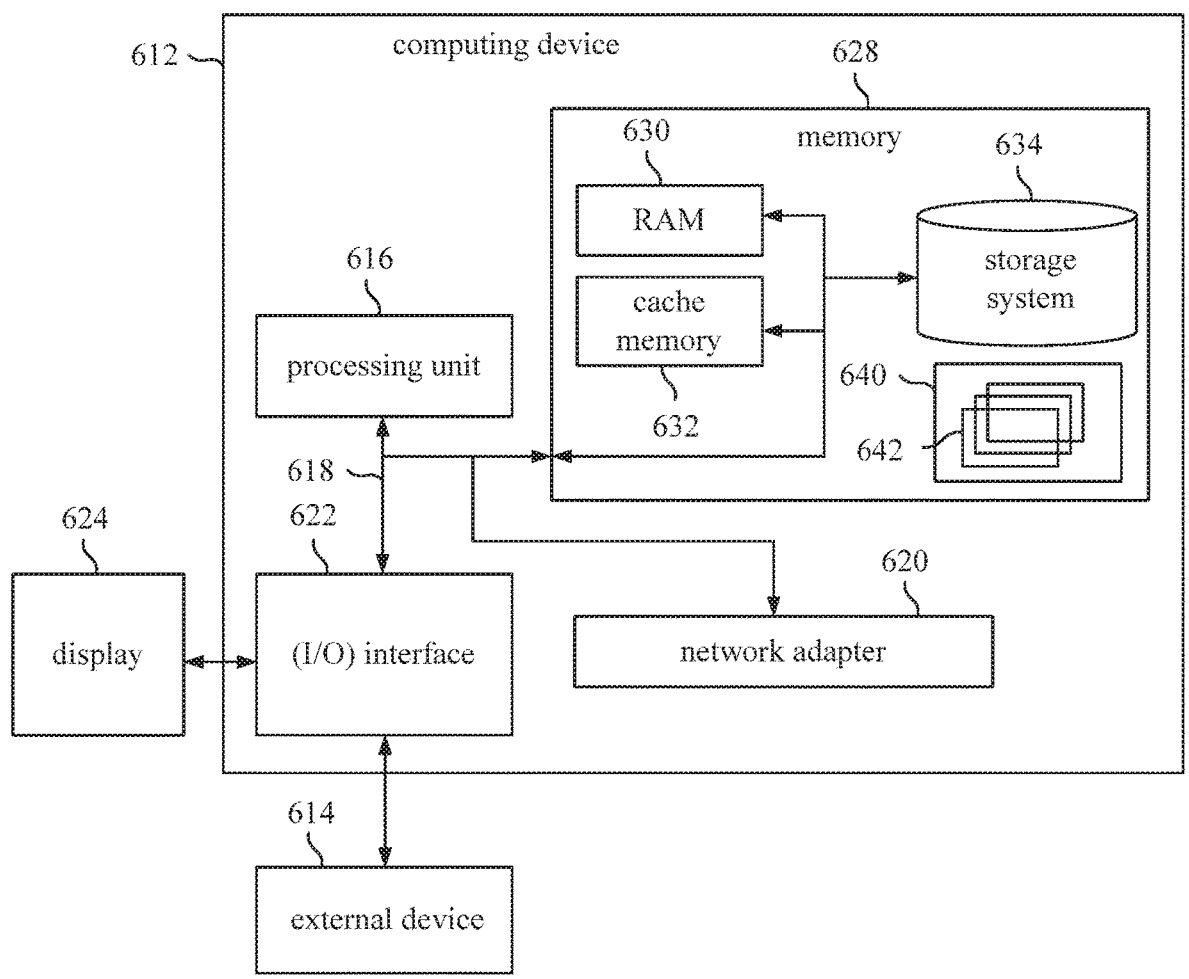
FIG. 6 is a schematic diagram of a computing device according to an embodiment of the present disclosure.

FIG. 6 is a schematic diagram of a computing device according to an embodiment of the present disclosure. FIG. 6 is a block diagram of an exemplary computing device 612 suitable for implementing embodiments of the present disclosure. The computing device 612 shown in FIG. 6 is merely an example and should not impose any limitation on the function and scope of usage of the embodiments of the present disclosure.

As illustrated in FIG. 6, the computing device 612 is in the form of a general-purpose computing apparatus. The computing device 612 may include, but is not limited to, one or more processors or processing units 616, a system memory 628, and a bus 618 connecting different system components (including the system memory 628 and the processing unit 616).

The bus 618 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronics standards association (VESA) local bus, and a peripheral component interconnect (PCI) bus.

Typically, the computing device 612 may include multiple kinds of computer-readable media. These media may be any storage media accessible by the computing device 612, including transitory or non-transitory storage medium and movable or unmovable storage medium.

The memory 628 may include a computer-readable medium in a form of volatile memory, such as a random access memory (RAM) 630 and/or a high-speed cache memory 632. The computing device 612 may further include other transitory/non-transitory storage media and movable/unmovable storage media. In way of example only, the storage system 634 may be used to read and write non-removable, non-volatile magnetic media (not shown in the Figure, commonly referred to as "hard disk drives"). Although not illustrated in FIG. 6, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 618 via one or more data medium interfaces. The memory 628 may include at least one program product, which has a set of (for example at least one) program modules configured to perform the functions of embodiments of the present disclosure.

A program/application 640 with a set of (at least one) program modules 642 may be stored in memory 628, the program modules 642 may include, but not limit to, an operating system, one or more application programs, other program modules and program data, and any one or combination of above examples may include an implementation in a network environment. The program modules 642 are generally configured to implement functions and/or methods described in embodiments of the present disclosure.

The device 612 may also communicate with one or more external devices 614 (e.g., a keyboard, a pointing device, a display 624, and etc.) and may also communicate with one or more devices that enables a user to interact with the computer system/server 612, and/or any device (e.g., a network card, a modem, and etc.) that enables the computer system/server 612 to communicate with one or more other computing devices. This kind of communication can be achieved by the input/output (I/O) interface 622. In addition, the device 612 may be connected to and communicate with one or more networks such as a local area network (LAN), a wide area network (WAN) and/or a public network such as the Internet through a network adapter 620. As shown, the network adapter 620 communicates with other modules of the device 612 over bus 618. It should be understood that although not shown in the figure, other hardware and/or software modules may be used in combination with the device 612, which including, but not limited to, microcode, device drivers, redundant processing units, external disk drive arrays, RAID systems, tape drives, as well as data backup storage systems and the like.

The processing unit 616 can perform various functional applications and data processing by running programs stored in the system memory 628, for example, to perform the method for generating the training corpus according to embodiments of the present disclosure. Pieces of data are mined out from user behavior logs associated with a target application. Each piece of data includes: a first behavior log and a second behavior log. The first behavior log includes a user speech and a corresponding speech recognition result. The second behavior log belongs to the same user as the first behavior log and is time-dependent with the first behavior log. The user speech and the corresponding speech recognition result in each piece of data are determined as a positive feedback sample of the training corpus or a negative feedback sample of the training corpus, based on a relationship between the first behavior log and the second behavior log in the corresponding piece of data.

The embodiment of the present disclosure provides a computer-readable storage medium, on which computer programs are stored, when the programs are executed by the processor to implement the method for generating the training corpus according to embodiments of the present disclosure. Pieces of data are mined out from user behavior logs associated with a target application. Each piece of data includes: a first behavior log and a second behavior log. The first behavior log includes a user speech and a corresponding speech recognition result. The second behavior log belongs to the same user as the first behavior log and is time-dependent with the first behavior log. The user speech and the corresponding speech recognition result in each piece of data are determined as a positive feedback sample of the training corpus or a negative feedback sample of the training corpus, based on a relationship between the first behavior log and the second behavior log in the corresponding piece of data.

The above storage medium including the computer executable instructions may adopt any combination of one or more computer-readable media. The computer-readable medium may be a computer-readable signal medium or a computer-readable storage medium. The computer-readable storage medium may be, but is not limited to, for example, an electrical, magnetic, optical, electromagnetic, infrared, or semiconductor system, apparatus, device, component or any combination thereof. Specific example of the computer-readable storage media includes (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof In context, the computer-readable storage medium may be any tangible medium including or storing programs. The programs may be used by an instruction executed system, apparatus or device, or a connection thereof.

The computer-readable signal medium may include a data signal propagating in baseband or as part of carrier which carries a computer-readable program codes. Such propagated data signal may be in many forms, including but not limited to an electromagnetic signal, an optical signal, or any suitable combination thereof The computer-readable signal medium may also be any computer-readable medium other than the computer-readable storage medium, which may send, propagate, or transport programs used by an instruction executed system, apparatus or device, or a combination thereof.

The program code stored on the computer-readable medium may be transmitted using any appropriate medium, including but not limited to wireless, wire line, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereinafter referred as to LAN) or a Wide Area Network (hereinafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for generating a training corpus, comprising:
    mining out pieces of data from user behavior logs associated with a target application, each piece of data comprising a first behavior log and a second behavior log, the first behavior log comprising a user speech and a corresponding speech recognition result, a second behavior log belonging to the same user as the first behavior log and time-dependent with the first behavior log; and
    determining the user speech and the corresponding speech recognition result in each piece of data as a positive feedback sample of the training corpus or a negative feedback sample of the training corpus, based on a relationship between the first behavior log and the second behavior log in the corresponding piece of data; constructing the training corpus based on the positive feedback sample and the negative feedback sample;
    sending the training corpus to a training corpus acceptance platform;
    receiving an accuracy rate indicator corresponding to the training corpus from the training corpus acceptance platform, wherein the training corpus acceptance platform determines whether each of samples in the training corpus is accurate, and calculates the accuracy rate indicator, the accuracy rate indicator is a ratio of a number of samples determined to be accurate in the samples in the training corpus and a total number of the samples in the training corpus; and
    in response to determining that the accuracy rate indicator satisfies a preset accuracy rate threshold, using the training corpus to perform optimization training on a speech recognition model of the target application.

2. The method of claim 1, wherein determining the user speech and the corresponding speech recognition result in each piece of data as the positive feedback sample of the training corpus or the negative feedback sample of the training corpus based on the relationship between the first behavior log and the second behavior log in the corresponding piece of data, comprises:
    obtaining an anticipated user behavior corresponding to the first behavior log, based on a type of the first behavior log; and
    determining the user speech and the corresponding speech recognition result in the corresponding piece of data as the positive feedback sample of the training corpus, in response to determining that the anticipated user behavior matches a user behavior recorded in the second behavior log.

3. The method of claim 2, wherein obtaining the anticipated user behavior corresponding to the first behavior log based on the type of the first behavior log, comprises:
    in response to determining that the type of the first behavior log is utilizing the speech recognition result corresponding to the user speech as a destination for launching a location search service, determining that the anticipated user behavior is selecting an option of launching a route search service that matches the destination in a search result page matching the location search service.

4. The method of claim 2, wherein obtaining the anticipated user behavior corresponding to the first behavior log based on the type of the first behavior log, comprises:
    in response to determining that the type of the first behavior log is utilizing the speech recognition result corresponding to the user speech as a destination for launching a route search service, determining that the anticipated user behavior is selecting an option of navigating to the destination in a route search result page matching the route search service.

5. The method of claim 2, wherein obtaining the anticipated user behavior corresponding to the first behavior log based on the type of the first behavior log, comprises:

in response to determining that the type of the first behavior log is utilizing the speech recognition result corresponding to the user speech as a destination for launching a route navigation service, determining that the anticipated user behavior is a successful arrival of the user to the destination.

6. The method of claim 1, wherein determining the user speech and the corresponding speech recognition result in each piece of data as the positive feedback sample of the training corpus or the negative feedback sample of the training corpus based on the relationship between the first behavior log and the second behavior log in the corresponding piece of data, comprises:
   determining the user speech and the corresponding speech recognition result in the corresponding piece of data as the negative feedback sample of the training corpus, in response to determining that a user behavior recorded in the second behavior log is a modification behavior on a user behavior recorded in the first behavior log during a predetermined period of time.

7. The method of claim 6, wherein determining that the user behavior recorded in the second behavior log is the modification behavior on the user behavior recorded in the first behavior log during the predetermined period of time, comprises:
   in response to determining that the user behavior recorded in the second behavior log is re-inputting a modification speech, and a modification recognition result corresponding to the modification speech and the speech recognition result satisfy a semantic association condition, determining that the user behavior recorded in the second behavior log is the modification behavior; and/or
   in response to determining that the user behavior recorded in the second behavior log is inputting a modification text, and the modification text and the speech recognition result satisfy a semantic association condition, determining that the user behavior recorded in the second behavior log is the modification behavior.

8. The method of claim 7, wherein the semantic association condition comprises: the modification recognition result or the modification text is different from the speech recognition result, and the modification recognition result or the modification text and the speech recognition result satisfy a preset semantic similarity condition.

9. The method of claim 7, wherein after determining the user speech and the corresponding speech recognition result in the corresponding piece of data as the negative feedback sample of the training corpus, the method further comprises:
   adding the modification recognition result or the modification text as a potential correct result to the negative feedback sample of the training corpus;
   transmitting the negative feedback sample of the training corpus to a manual label model such that the manual label model labels a correct recognition result corresponding to the user speech for the potential correct result; and
   updating the negative feedback sample of the training corpus using a label result fed back by the manual label model.

10. The method of claim 1, wherein the target application comprises a map application.

11. The method of claim 1, further comprising:
   in response to determining that the accuracy rate indicator does not satisfy the preset accuracy rate threshold, returning the mining out pieces of data from the user behavior logs associated with the target application.

12. A computing device comprising:
   a memory;
   a processor; and
   computer programs stored on the memory and operative on the processor,
   wherein the processor is configured to, when executing the programs implement:
   mining out pieces of data from user behavior logs associated with a target application, each piece of data comprising a first behavior log and a second behavior log, the first behavior log comprising a user speech and a corresponding speech recognition result, a second behavior log belonging to the same user as the first behavior log and time-dependent with the first behavior log;
   determining the user speech and the corresponding speech recognition result in each piece of data as a positive feedback sample of the training corpus or a negative feedback sample of the training corpus, based on a relationship between the first behavior log and the second behavior log in the corresponding piece of data;
   constructing the training corpus based on the positive feedback sample and the negative feedback sample;
   sending the training corpus to a training corpus acceptance platform;
   receiving an accuracy rate indicator corresponding to the training corpus from the training corpus acceptance platform, wherein the training corpus acceptance platform determines whether each of samples in the training corpus is accurate, and calculates the accuracy rate indicator, the accuracy rate indicator is a ratio of a number of samples determined to be accurate in the samples in the training corpus and a total number of the samples in the training corpus; and
   in response to determining that the accuracy rate indicator satisfies a preset accuracy rate threshold, using the training corpus to perform optimization training on a speech recognition model of the target application.

13. The device of claim 12, wherein determining the user speech and the corresponding speech recognition result in each piece of data as the positive feedback sample of the training corpus or the negative feedback sample of the training corpus based on the relationship between the first behavior log and the second behavior log in the corresponding piece of data, comprises:
   obtaining an anticipated user behavior corresponding to the first behavior log, based on a type of the first behavior log; and
   determining the user speech and the corresponding speech recognition result in the corresponding piece of data as the positive feedback sample of the training corpus, in response to determining that the anticipated user behavior matches a user behavior recorded in the second behavior log.

14. The device of claim 13, wherein obtaining the anticipated user behavior corresponding to the first behavior log based on the type of the first behavior log, comprises:
   in response to determining that the type of the first behavior log is utilizing the speech recognition result corresponding to the user speech as a destination for launching a location search service, determining that the anticipated user behavior is selecting an option of launching a route search service that matches the destination in a search result page matching the location search service; or
   in response to determining that the type of the first behavior log is utilizing the speech recognition result corresponding to the user speech as a destination for launching a route search service, determining that the anticipated user behavior is selecting an option of navigating to the destination in a route search result page matching the route search service; or in response to determining that the type of the first behavior log is utilizing the speech recognition result corresponding to the user speech as a destination for launching a route navigation service, determining that the anticipated user behavior is a successful arrival of the user to the destination.

15. The device of claim 12, wherein determining the user speech and the corresponding speech recognition result in each piece of data as the positive feedback sample of the training corpus or the negative feedback sample of the training corpus based on the relationship between the first behavior log and the second behavior log in the corresponding piece of data, comprises:

determining the user speech and the corresponding speech recognition result in the corresponding piece of data as the negative feedback sample of the training corpus, in response to determining that a user behavior recorded in the second behavior log is a modification behavior on a user behavior recorded in the first behavior log during a predetermined period of time.

16. The device of claim 15, wherein determining that the user behavior recorded in the second behavior log is the modification behavior on the user behavior recorded in the first behavior log during the predetermined period of time, comprises:

in response to determining that the user behavior recorded in the second behavior log is re-inputting a modification speech, and a modification recognition result corresponding to the modification speech and the speech recognition result satisfy a semantic association condition, determining that the user behavior recorded in the second behavior log is the modification behavior; and/or in response to determining that the user behavior recorded in the second behavior log is inputting a modification text, and the modification text and the speech recognition result satisfy a semantic association condition, determining that the user behavior recorded in the second behavior log is the modification behavior.

17. The device of claim 16, wherein the processor is further configured to, when executing the programs implement:

adding the modification recognition result or the modification text as a potential correct result to the negative feedback sample of the training corpus;

transmitting the negative feedback sample of the training corpus to a manual label model such that the manual label model labels a correct recognition result corresponding to the user speech for the potential correct result; and updating the negative feedback sample of the training corpus using a label result fed back by the manual label model.

18. A non-transient computer-readable storage medium having computer programs stored thereon, wherein when the computer programs are executed by a processor, a method for generating a training corpus is implemented, and the method comprises:

mining out pieces of data from user behavior logs associated with a target application, each piece of data comprising a first behavior log and a second behavior log, the first behavior log comprising a user speech and a corresponding speech recognition result, a second behavior log belonging to the same user as the first behavior log and time-dependent with the first behavior log; and determining the user speech and the corresponding speech recognition result in each piece of data as a positive feedback sample of the training corpus or a negative feedback sample of the training corpus, based on a relationship between the first behavior log and the second behavior log in the corresponding piece of data;

constructing the training corpus based on the positive feedback sample and the negative feedback sample;

sending the training corpus to a training corpus acceptance platform;

receiving an accuracy rate indicator corresponding to the training corpus from the training corpus acceptance platform, wherein the training corpus acceptance platform determines whether each of samples in the training corpus is accurate, and calculates the accuracy rate indicator, the accuracy rate indicator is a ratio of a number of samples determined to be accurate in the samples in the training corpus and a total number of the samples in the training corpus; and in response to determining that the accuracy rate indicator satisfies a preset accuracy rate threshold, using the training corpus to perform optimization training on a speech recognition model of the target application.

* * * * *